(12) United States Patent
Wissmueller et al.

(10) Patent No.: US 9,834,064 B2
(45) Date of Patent: Dec. 5, 2017

(54) VEHICLE VENTILATION MODULE AND DEVICE

(71) Applicant: Brose Fahrzeugteile GmbH & Co. KG Würzburg, Würzburg (DE)

(72) Inventors: Thomas Wissmueller, Kitzingen (DE); David Rosales, Rochester Hills, MI (US); James Salo, Waterford, MI (US); Derek Mudge, Auburn Hills, MI (US)

(73) Assignee: Brose Fahrzeugteile GmbH & Co. KG, Wurzburg, Wurzburg (DE)

( * ) Notice: Subject to any disclaimer, the term of this patent is extended or adjusted under 35 U.S.C. 154(b) by 738 days.

(21) Appl. No.: 13/741,253

(22) Filed: Jan. 14, 2013

(65) Prior Publication Data
US 2014/0199933 A1    Jul. 17, 2014

(51) Int. Cl.
*B60H 1/24* (2006.01)
*F16K 31/04* (2006.01)
*B60H 1/00* (2006.01)

(52) U.S. Cl.
CPC ......... *B60H 1/249* (2013.01); *B60H 1/00678* (2013.01); *F16K 31/041* (2013.01)

(58) Field of Classification Search
CPC .... B60H 1/249; B60H 1/00678; F16K 31/041
USPC .................................. 454/162; 165/202, 42
See application file for complete search history.

(56) References Cited

U.S. PATENT DOCUMENTS

| 2,297,892 | A | 10/1942 | Jacobs |
| 3,391,628 | A | 7/1968 | Ziegenfelder |
| 3,392,654 | A | 7/1968 | Grenier |
| 3,405,968 | A | 10/1968 | Feles et al. |
| 3,525,296 | A | 8/1970 | Haapanen |
| 3,911,801 | A | 10/1975 | Stolz |
| 3,967,779 | A * | 7/1976 | Logsdon ................. F16K 11/16 137/601.01 |
| 4,144,803 | A | 3/1979 | Götz et al. |

(Continued)

FOREIGN PATENT DOCUMENTS

| DE | 1 903 012 | 8/1970 |
| DE | 43 22 213 C1 | 6/1994 |

(Continued)

*Primary Examiner* — Helena Kosanovic
(74) *Attorney, Agent, or Firm* — Lewis Roca Rothgerber Christie LLP

(57) ABSTRACT

A vehicle ventilation module for allowing air to exhaust from the inside of a vehicle compartment, comprising a carrier element to be mounted to the vehicle, the carrier element comprising:
- at least one vent opening for allowing air to exhaust from the inside of a vehicle compartment when the vehicle ventilation module is mounted to the vehicle;
- at least one flap being pivotable about a swivel axis at the carrier element between a close position and an open position, wherein the vent opening is covered by the flap in the close position and is at least partially uncovered by the flap in the open position so that air may flow through the vent opening; and
- an actuating mechanism coupled to the flap for pivoting the flap about its swivel axis from the close position to the open position.

The actuating mechanism is actuated to pivot the flap to the open position by a current applied to the actuating mechanism.

12 Claims, 20 Drawing Sheets

(56) References Cited

U.S. PATENT DOCUMENTS

| | | | |
|---|---|---|---|
| 4,665,799 A * | 5/1987 | Bouvot | B60H 1/00857 137/625.21 |
| 4,667,578 A | 5/1987 | Hagenah | |
| 4,920,865 A | 5/1990 | Pasquali et al. | |
| 5,105,849 A | 4/1992 | Clough | |
| 5,167,574 A | 12/1992 | Ikeda et al. | |
| 5,186,387 A * | 2/1993 | Doi | B60H 1/00871 236/49.3 |
| 5,263,895 A | 11/1993 | Kraus et al. | |
| 5,488,805 A | 2/1996 | Mass | |
| 5,695,397 A | 12/1997 | Frank et al. | |
| 5,727,999 A | 3/1998 | Lewis | |
| 5,954,579 A * | 9/1999 | Masui | B60H 1/3414 454/125 |
| 6,273,127 B1 * | 8/2001 | Wade | B60H 1/249 137/512.15 |
| 6,458,027 B1 | 10/2002 | Stiehl | |
| 2002/0007642 A1 * | 1/2002 | Reinisch | B60H 1/00671 62/244 |
| 2002/0148507 A1 | 10/2002 | Porter et al. | |
| 2004/0149337 A1 | 8/2004 | Koeger et al. | |
| 2005/0081921 A1 | 4/2005 | Blake, III et al. | |
| 2005/0098215 A1 | 5/2005 | Call et al. | |
| 2005/0230096 A1 * | 10/2005 | Yamaoka | B60H 1/03 165/202 |
| 2007/0175523 A1 | 8/2007 | Levey et al. | |
| 2008/0178526 A1 * | 7/2008 | Browne | F24F 13/1426 49/82.1 |
| 2010/0120346 A1 | 5/2010 | Jansen | |
| 2010/0216384 A1 | 8/2010 | McCarthy et al. | |
| 2010/0291854 A1 * | 11/2010 | Carlson | B60H 1/249 454/162 |
| 2011/0230129 A1 | 9/2011 | Weber | |
| 2011/0284183 A1 * | 11/2011 | Yamashita | B60H 1/00678 165/63 |

FOREIGN PATENT DOCUMENTS

| | | |
|---|---|---|
| DE | 44 34 136 A1 | 3/1996 |
| EP | 0 742 115 A2 | 11/1996 |
| GB | 2 170 900 A | 8/1986 |
| JP | 60161213 A | 8/1985 |
| WO | WO 98/36924 | 8/1998 |

\* cited by examiner

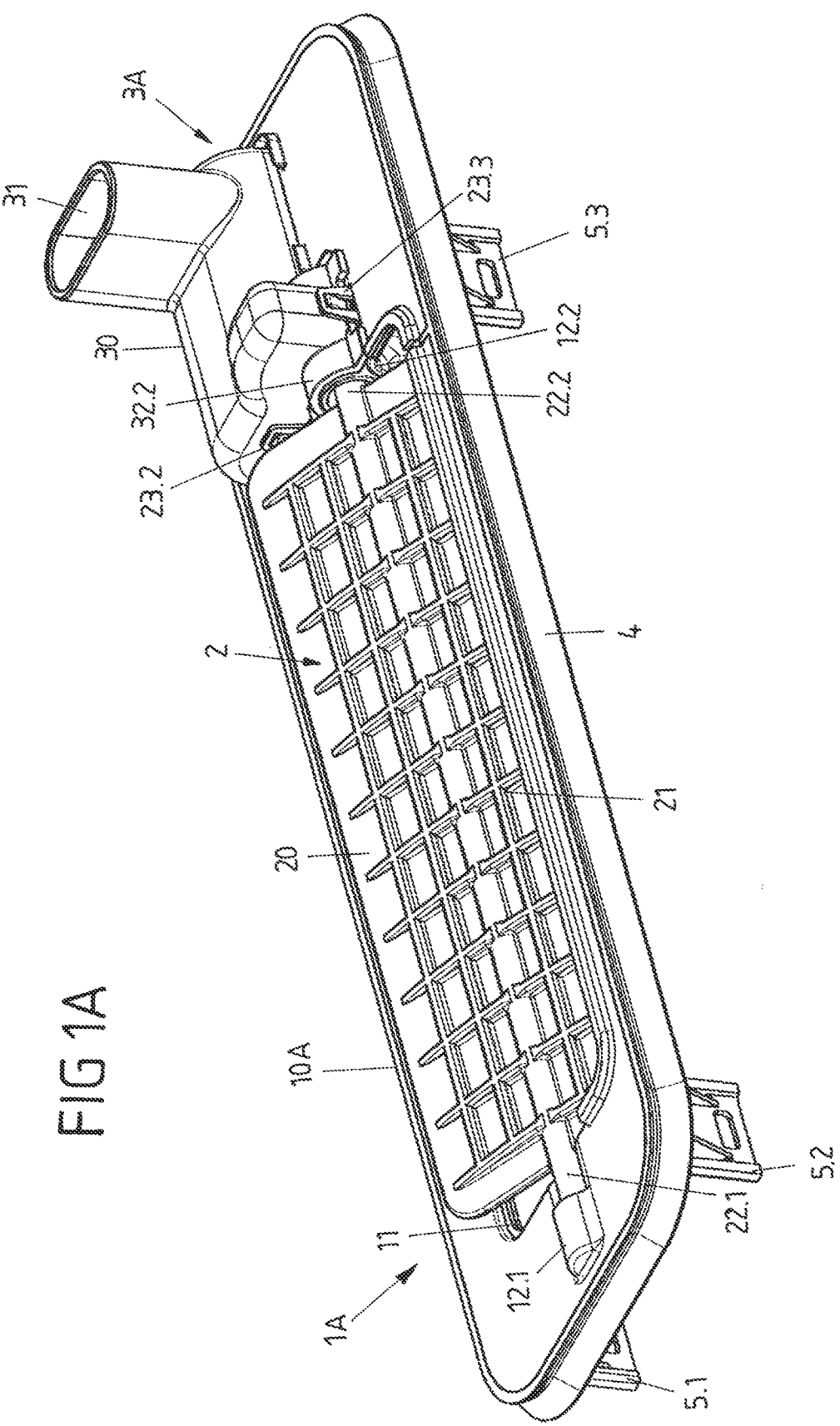

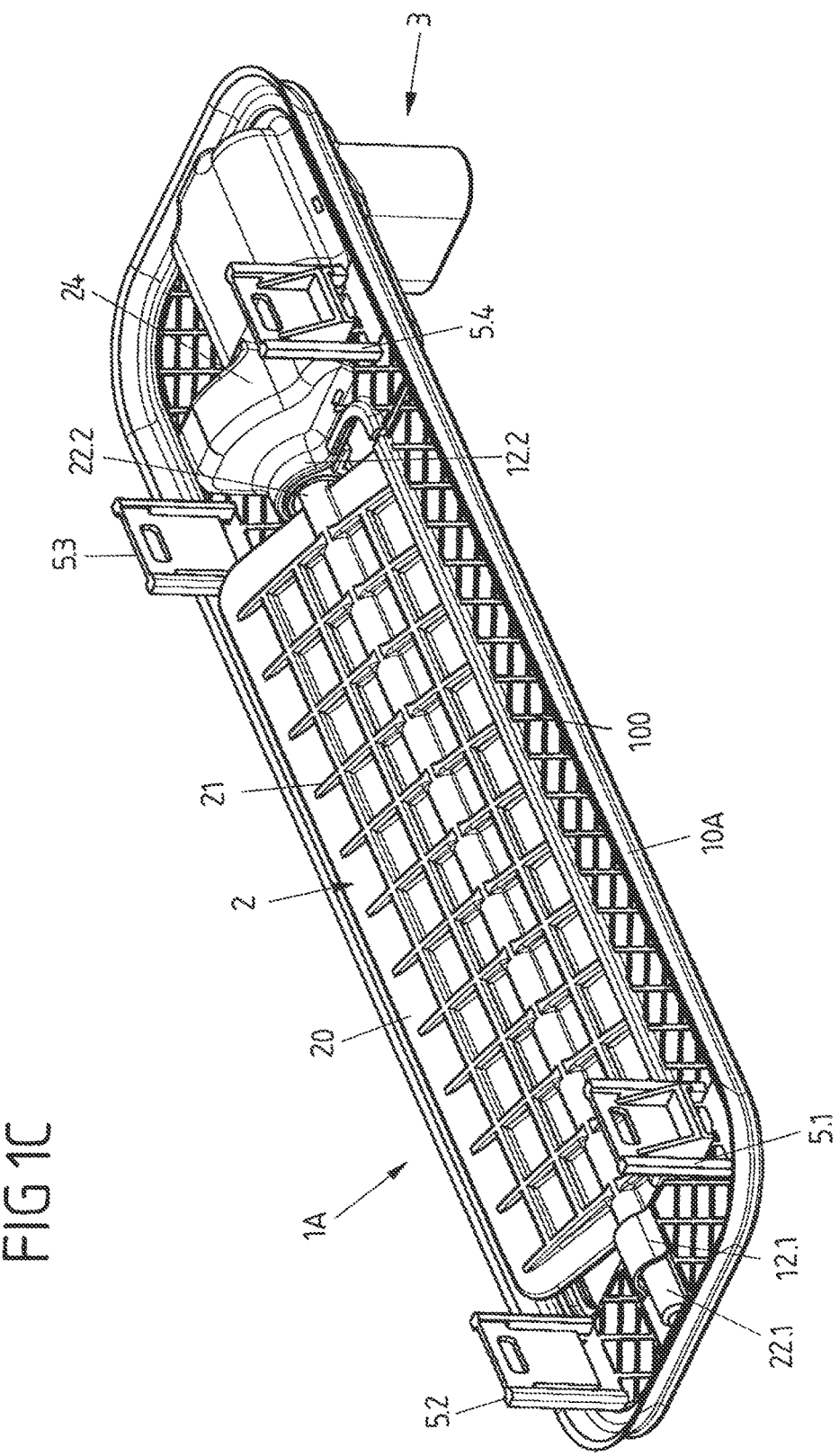

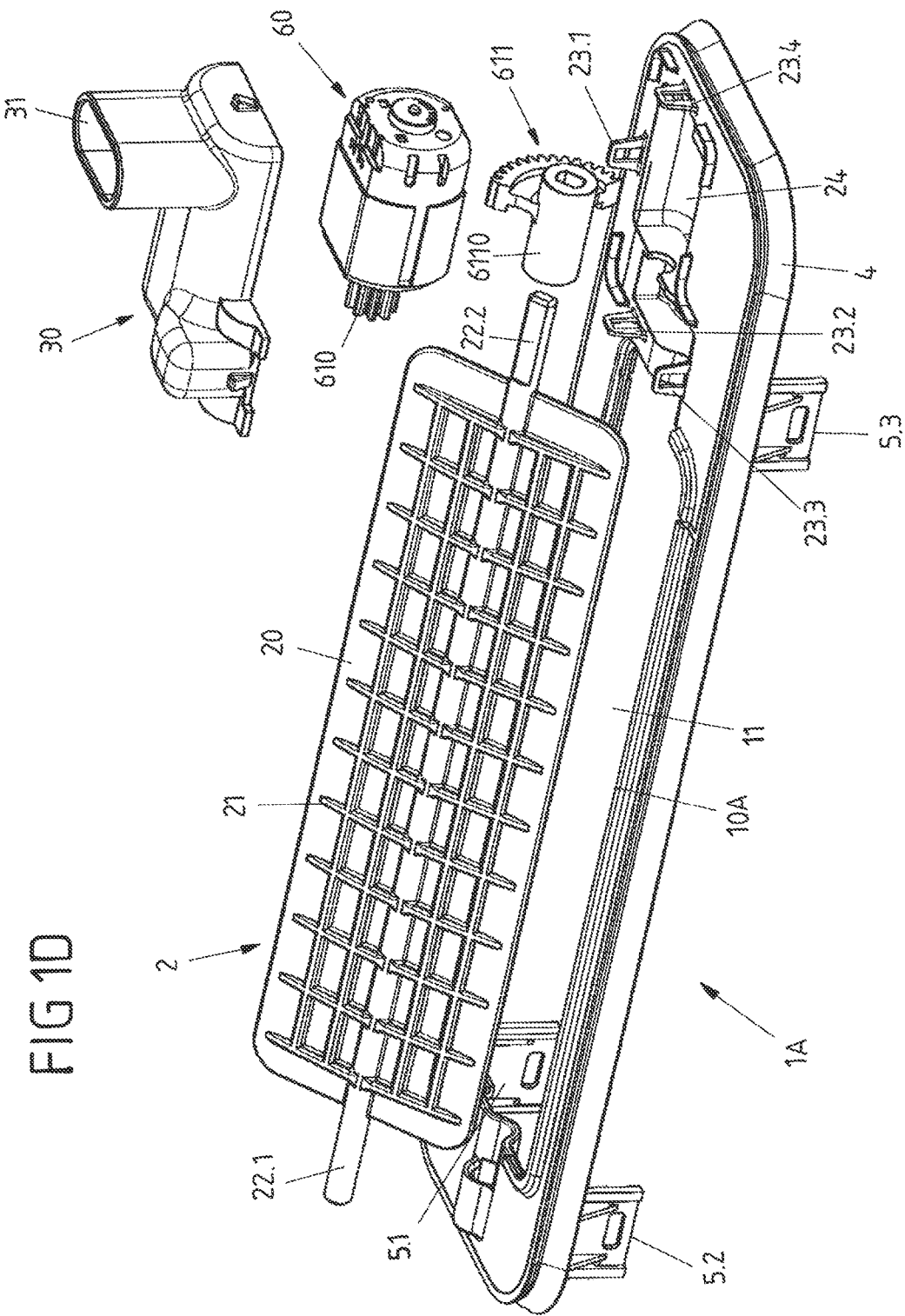

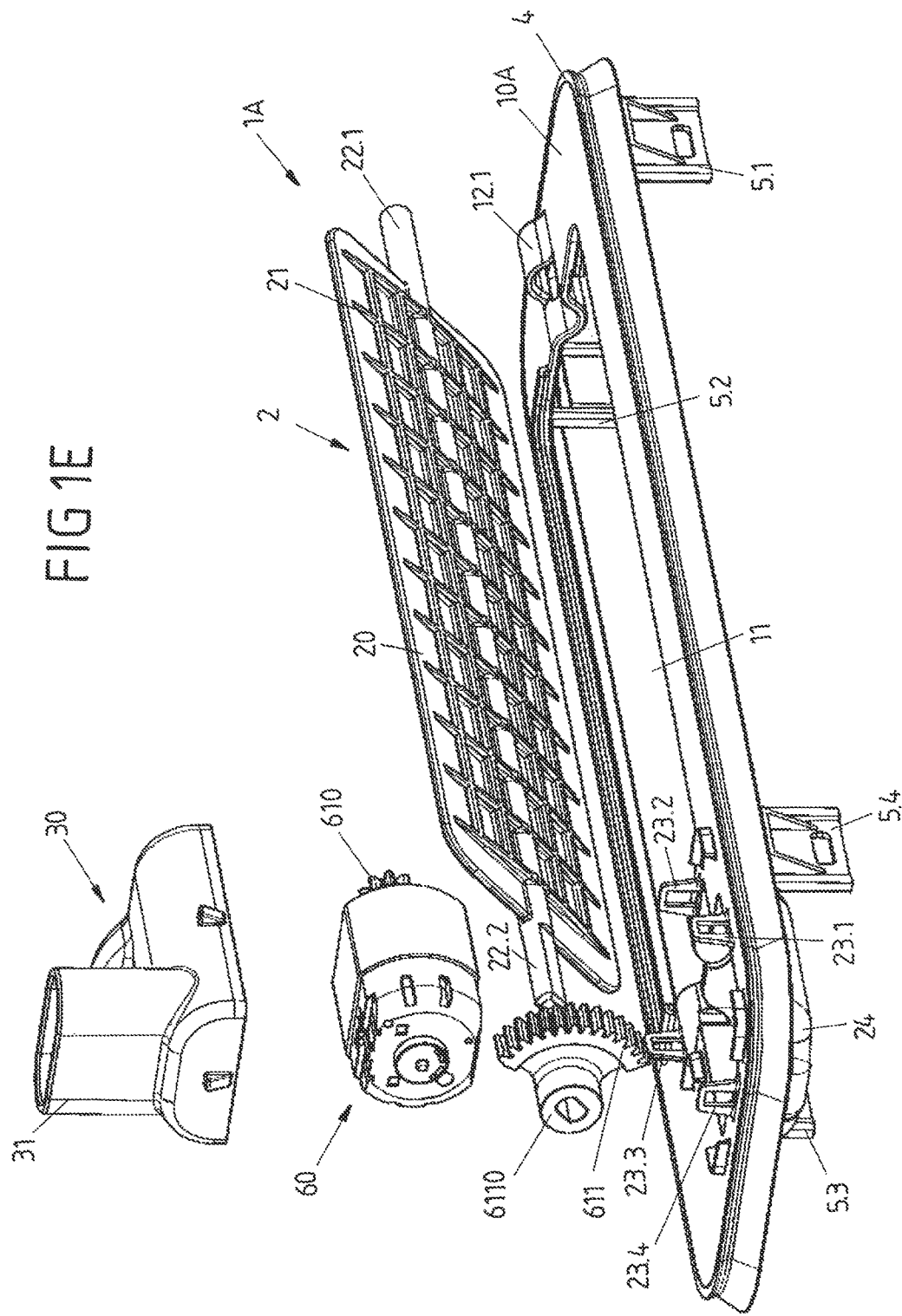

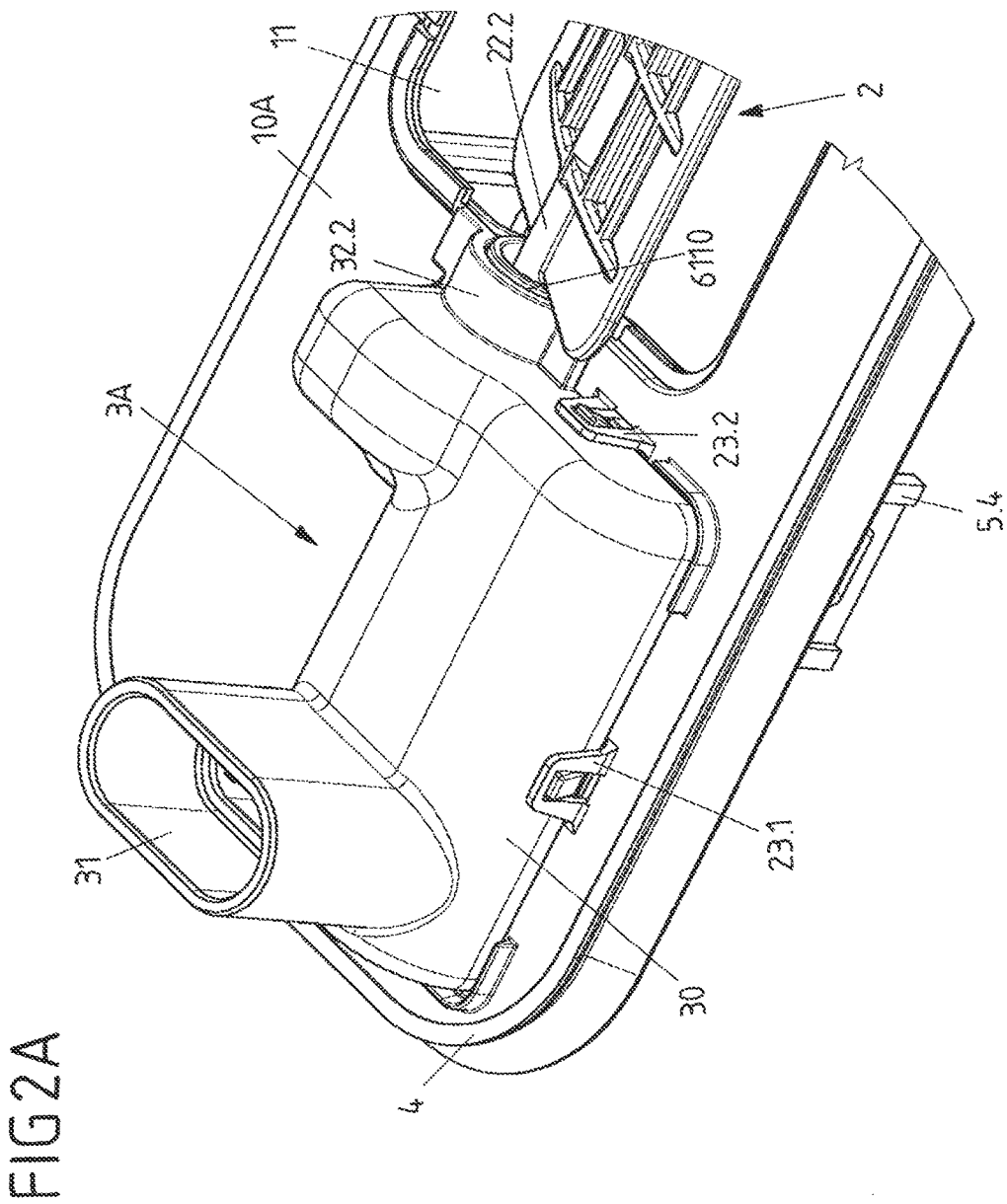

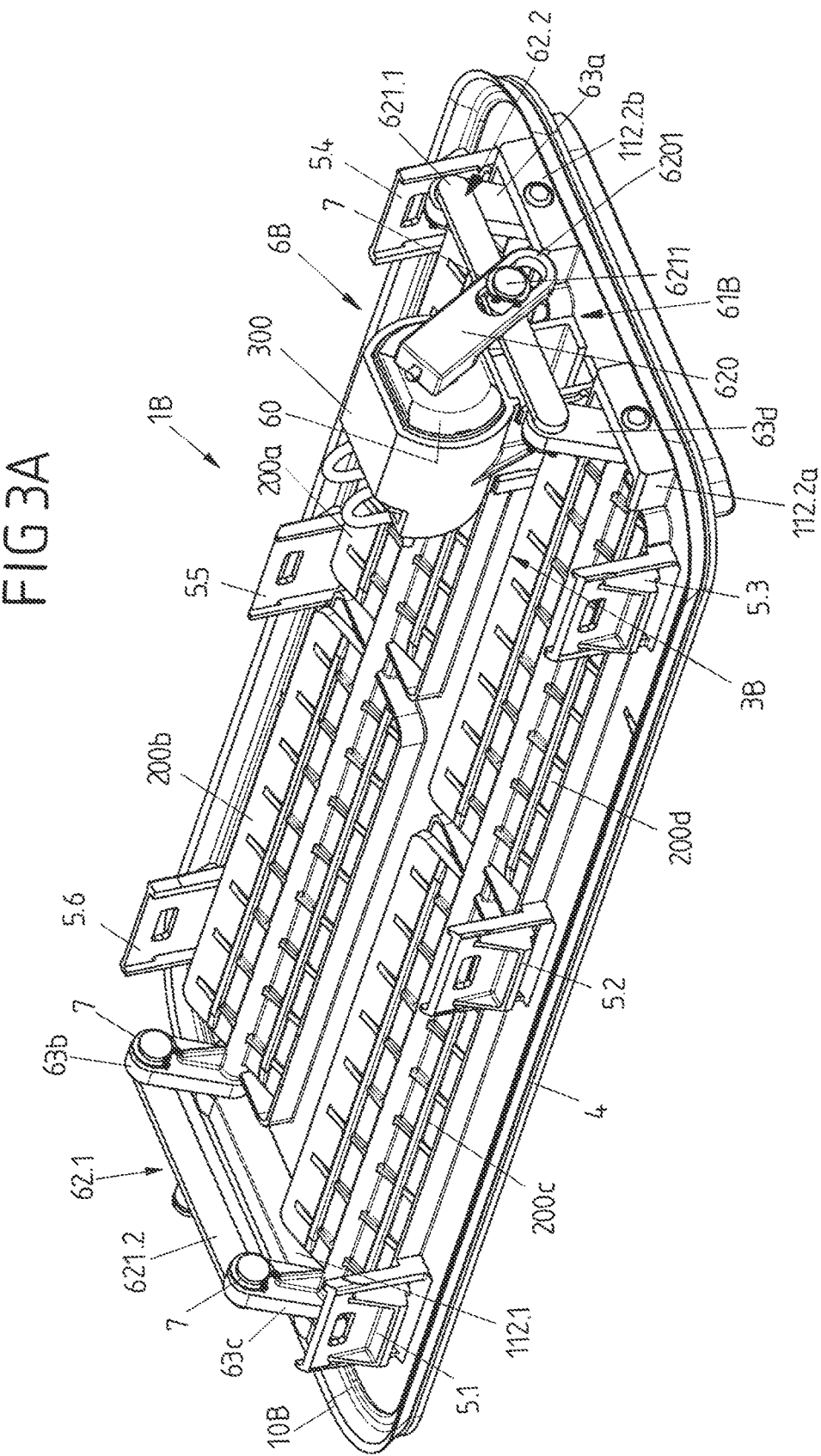

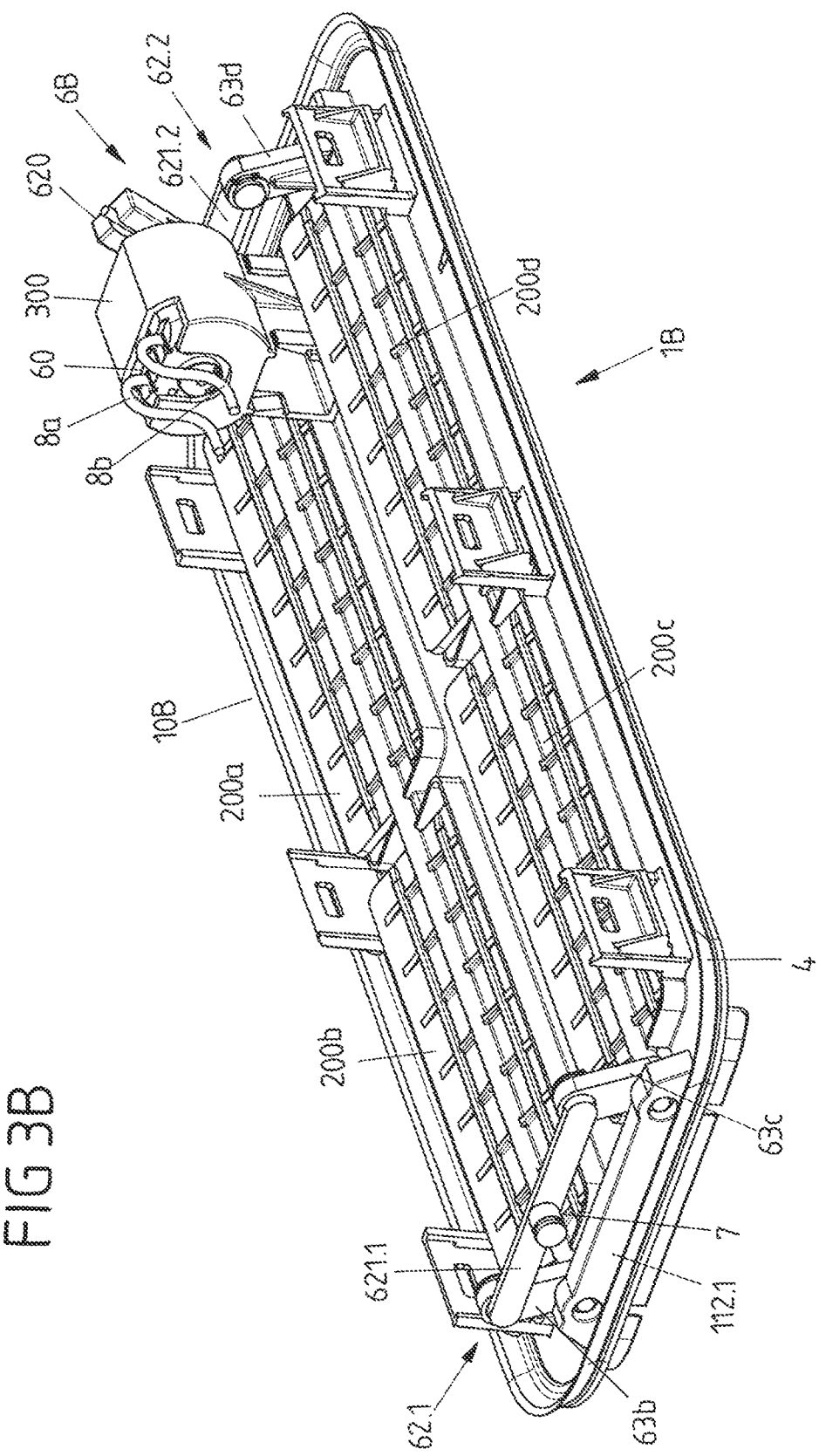

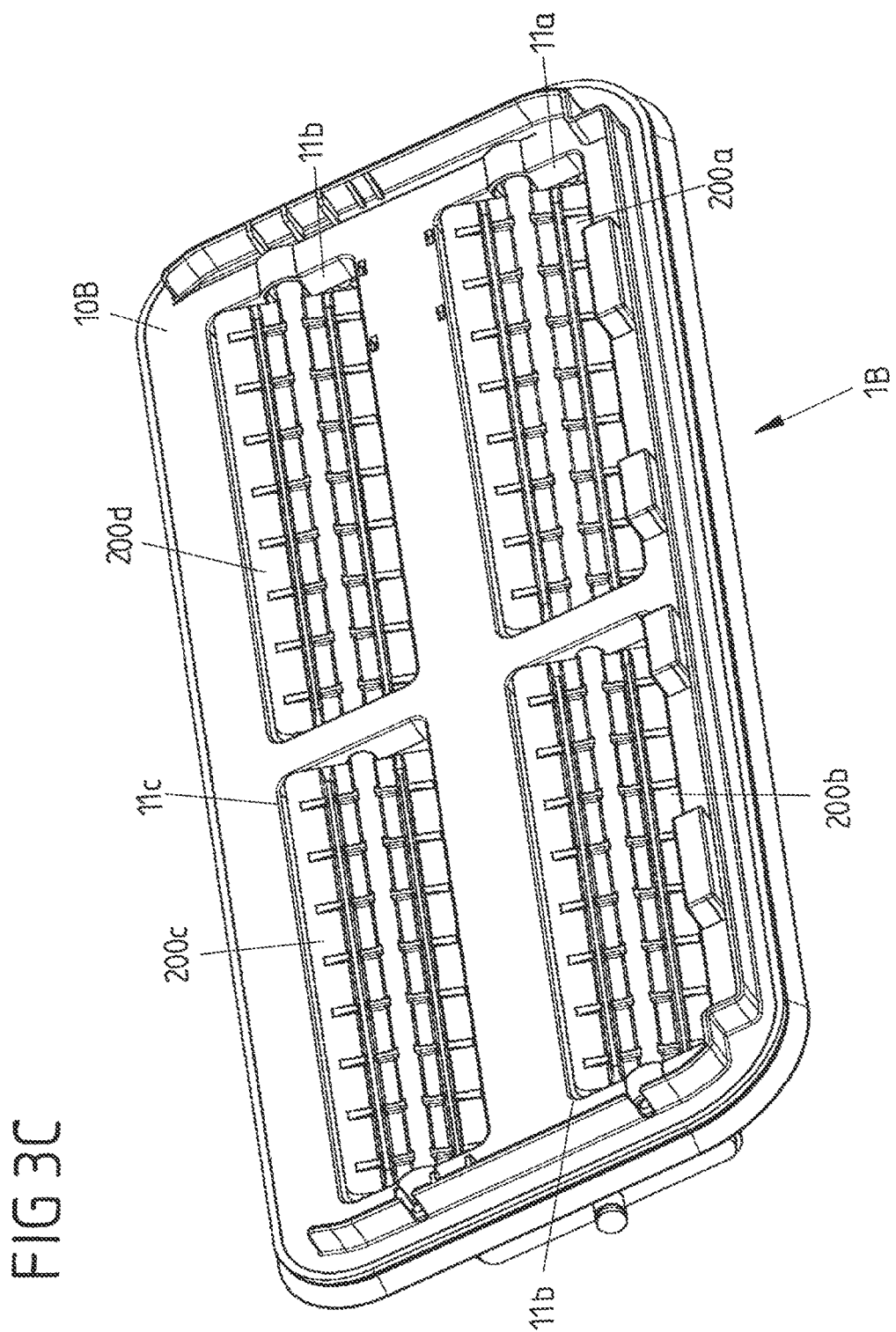

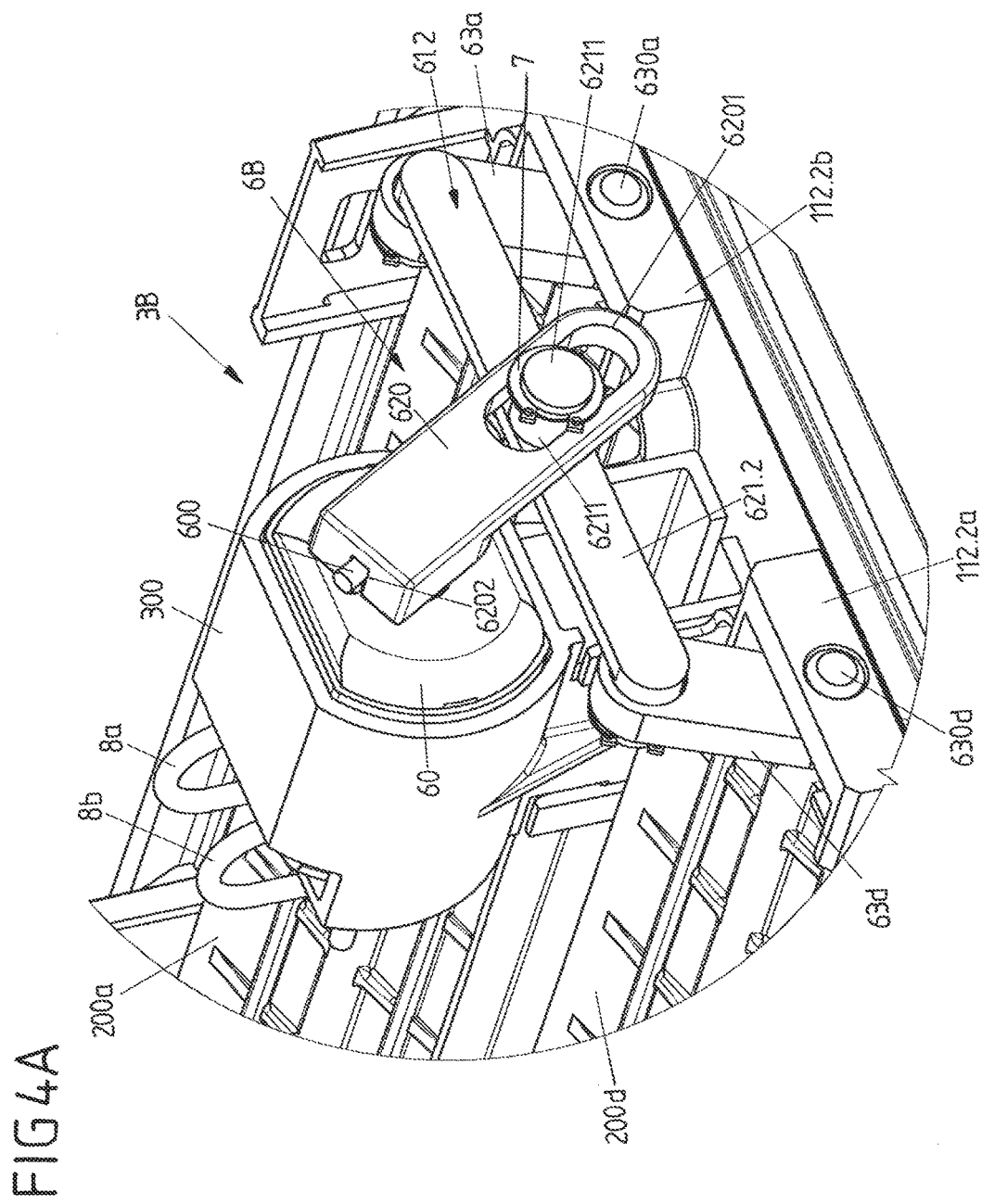

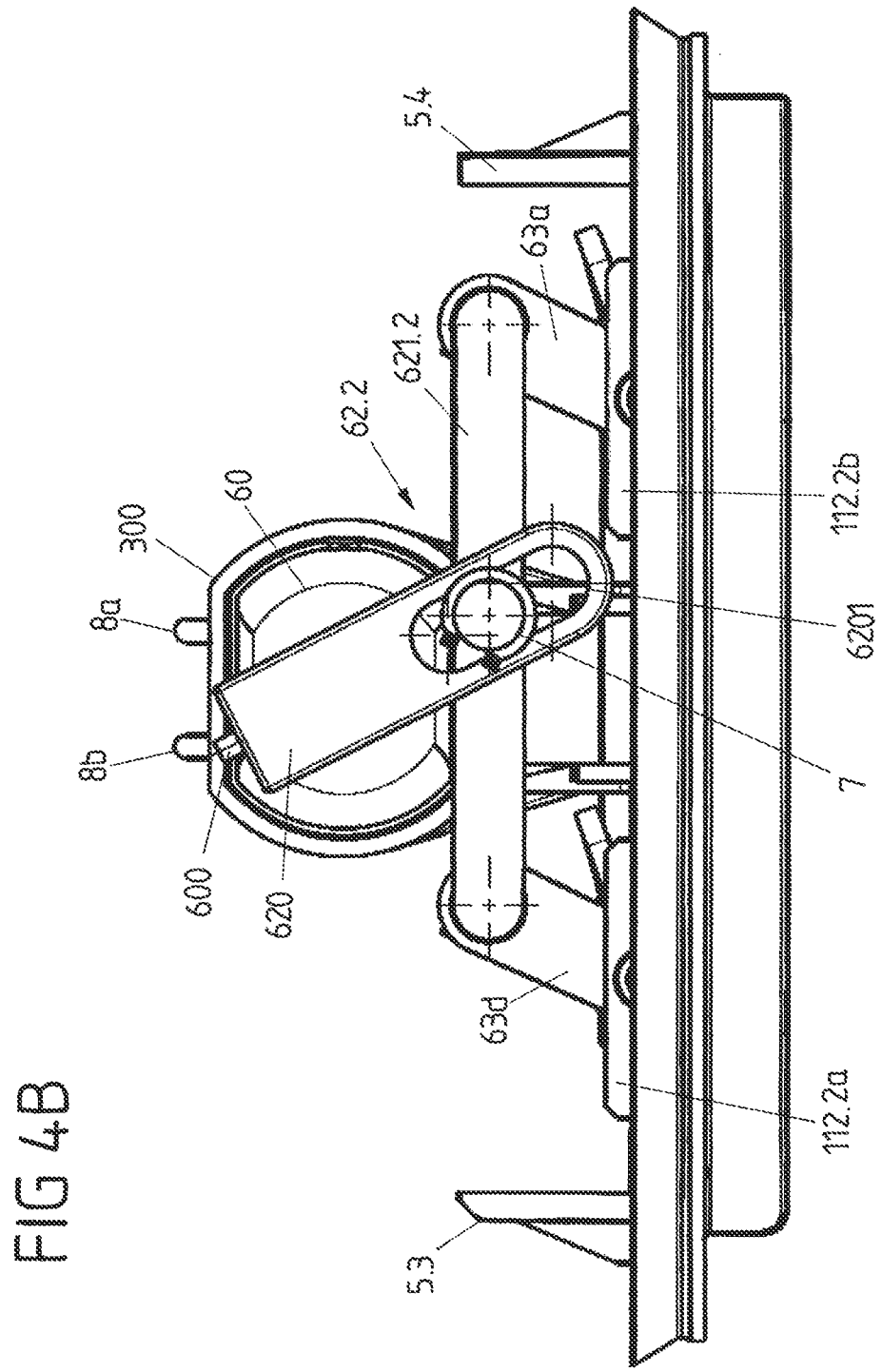

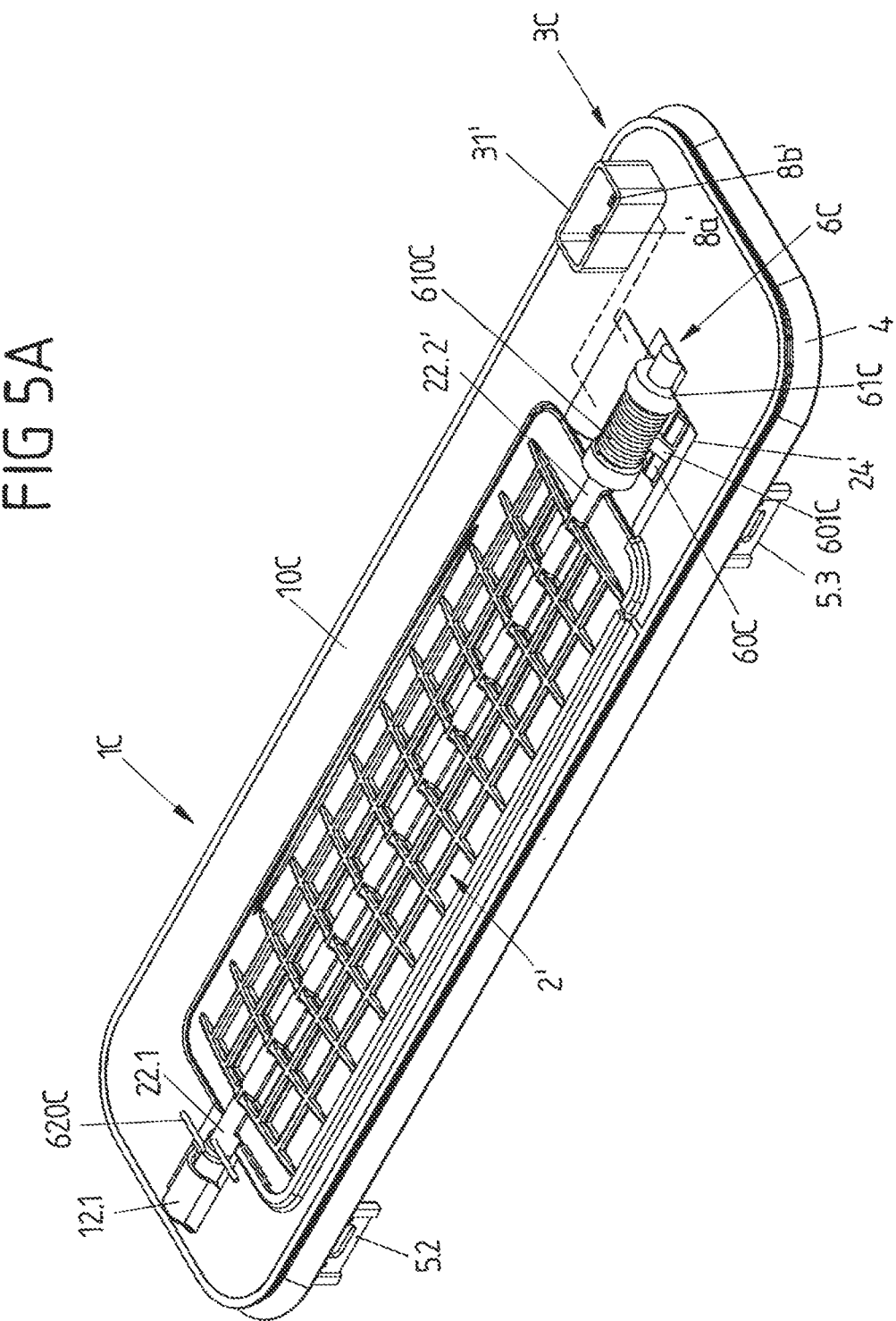

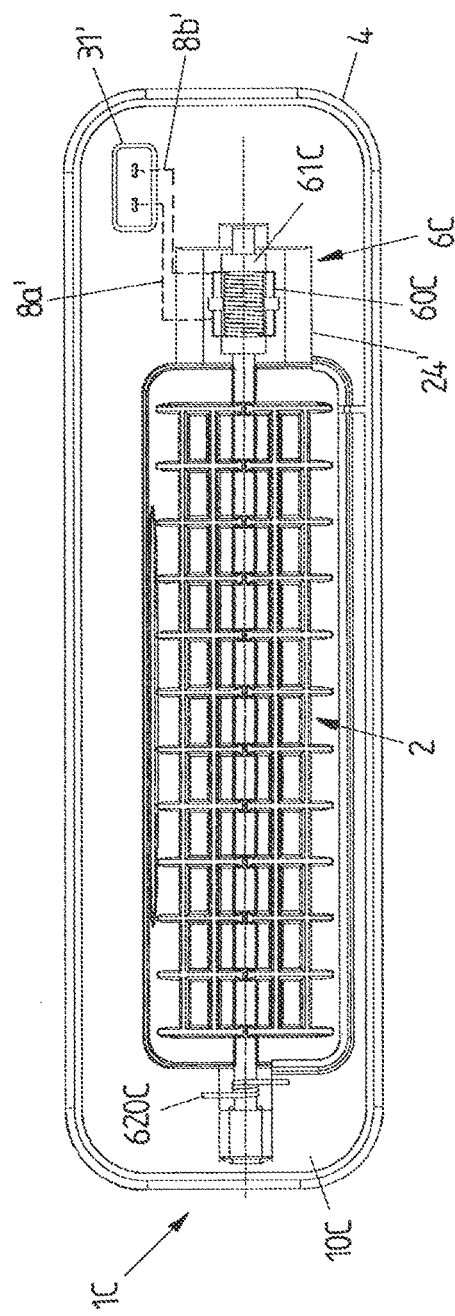
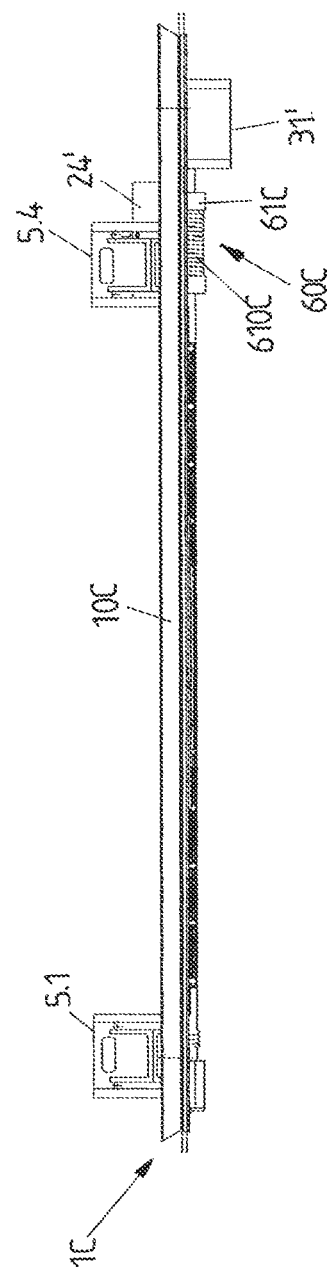

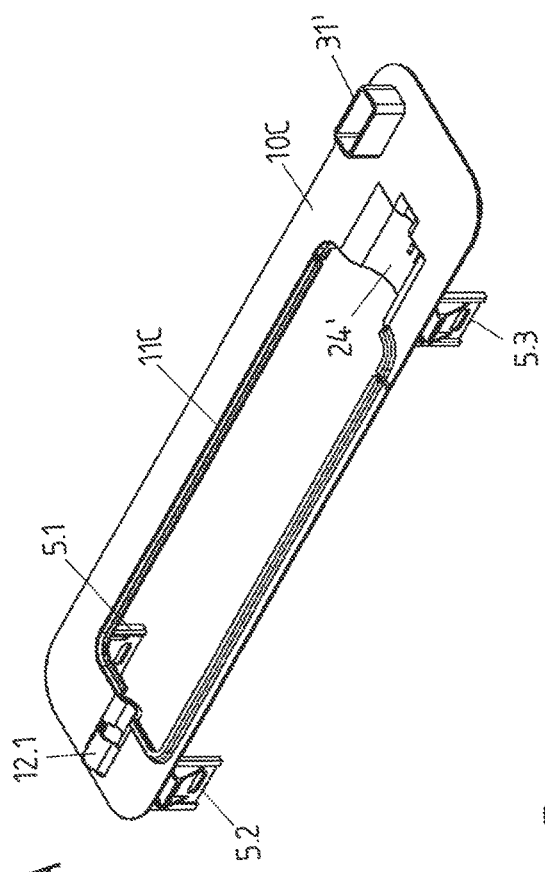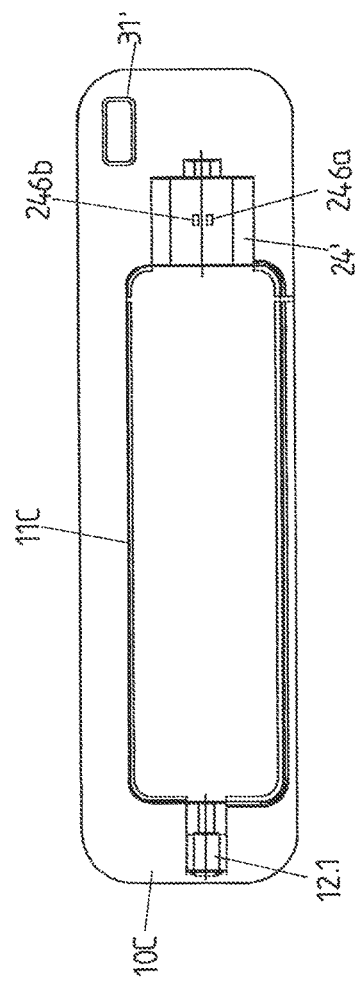
FIG 6A
FIG 6B

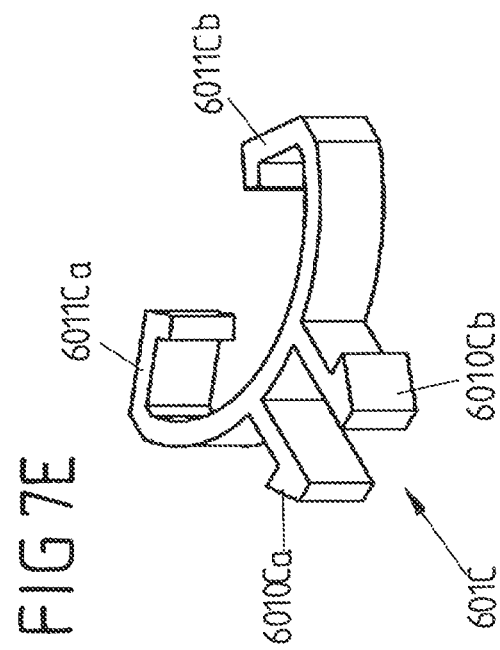
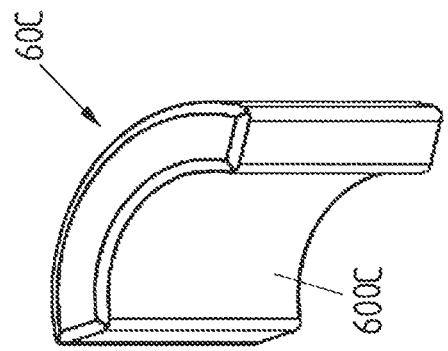
FIG 7E
FIG 7F

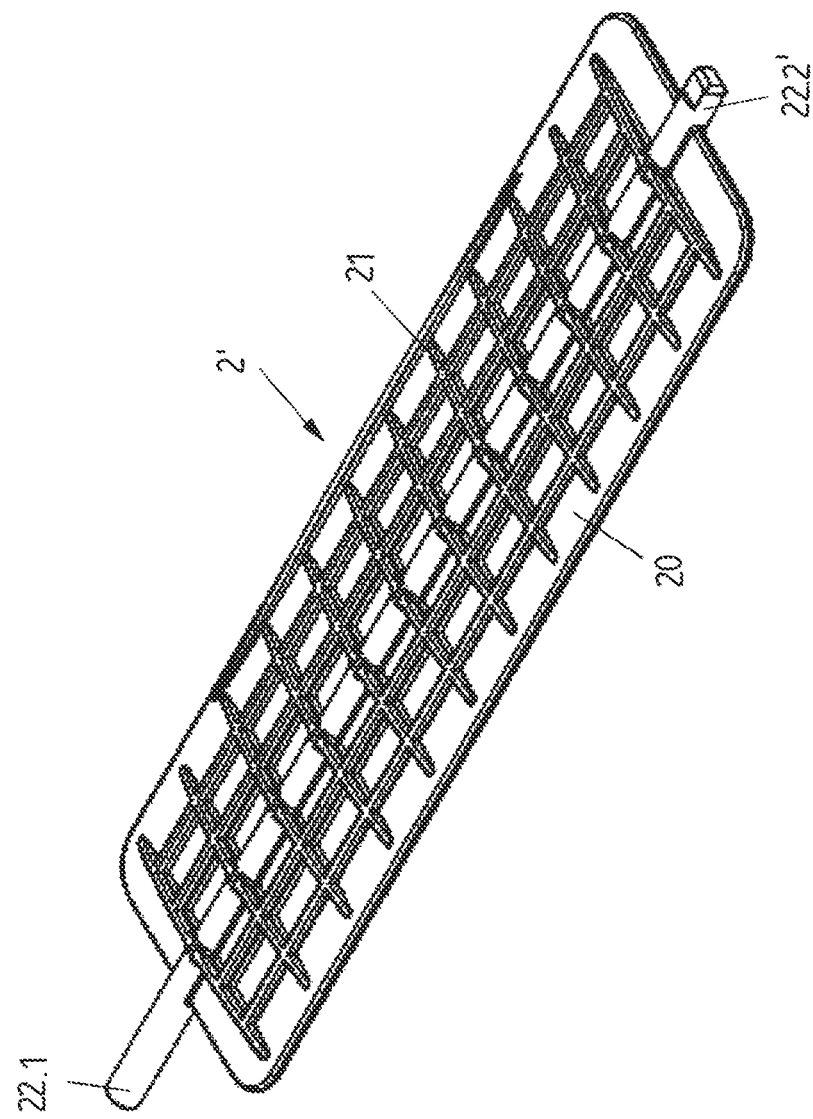

VEHICLE VENTILATION MODULE AND DEVICE

BACKGROUND OF THE INVENTION

The present invention relates to a vehicle ventilation module for allowing air to exhaust from the inside of a vehicle compartment and to a vehicle ventilation device for the same purpose.

Such vehicle ventilation modules or devices are preferably provided for equalizing the pressure between the interior of the vehicle compartment and the atmosphere. By means of at least one vent opening covered by a flap in a close position and at least partially uncovered by the flap in an open position a flow of air through the vent opening may be selectively regulated. In an open position or open state of the at least one flap of the ventilation module or device, air from the interior of the vehicle compartment may flow through the vent opening in order to reduce an air pressure within the vehicle compartment. Without a ventilation module or ventilation device at the vehicle, its interior is often not vented properly to the atmosphere. This could result in a significant increase in an effort to close a door of the vehicle. Further, a closing or even slamming of a vehicle door may increase the pressure in the interior of the vehicle compartment suddenly and tremendously with an uncomfortable effect for passengers in the vehicle compartment.

In U.S. Pat. Nos. 5,167,574, 6,273,127 B1 and US 2010/0216384 A1 different vehicle ventilation devices are described in which a flap for covering a vent opening is in each case just pressure-sensitive and thus merely opens when an air pressure within the vehicle compartment exceeds the atmospheric pressure outside the vehicle by a significant amount. Furthermore, only in U.S. Pat. No. 5,176,574 an actuating mechanism is described to effectively close a flap of a ventilation device. Here, a permanent magnet is provided which applies a magnetic force to the flap in its open position to attract it back to its close position and to hold the flap in its close position.

The ventilation modules or devices of the prior art relying on an opening of a corresponding flap solely based on an increase of air pressure within the vehicle compartment in most cases do not uncover a vent opening fast enough, since it is often experienced that the over-pressure caused by slamming a vehicle door still results in pressure waves hitting the eardrum of a passenger within the vehicle compartment before the flap opens or after the flap has opened. Since a flap covering the vent opening in its close position has to close the vent opening in such a way that no noise, water, dirt or small animals may get into the vehicle compartment through the vent opening, the flap has to seal the vent opening in its close position. If the flap in its close position rests to too tightly within the vent opening, a significant higher over-pressure has to be established to open the flap. On the other hand, if the flap does not rest tightly within or on the vent opening, rattling noises due to driving vibrations are likely.

Additionally, ventilation modules or devices in which a flap is moved from its close position to its open position merely upon a sufficient increase in air pressure within the vehicle compartment are very restricted in its mounting positions, since the gravity acting on the flap must be taken into account. If the closing of the flap solely relies on the effect of gravity the mounting positions of a corresponding ventilation module or device are very restricted. A swivel axis of the flap must extend more or less horizontally but may not extend vertically at the vehicle. Otherwise the flap may not be returned to its close position when the air pressure within the vehicle compartment has decreased.

Therefore, there is a need for an improved vehicle ventilation module and device for allowing air to exhaust from the inside of a vehicle compartment which avoids the above-described disadvantages and still effectively prevents noise, water, dirt and small animals from getting into the interior of the vehicle.

SUMMARY OF THE INVENTION

It is thus an object of the present invention to solve the above-specified problems by providing an actuating mechanism for a ventilation module or device by means of which a flap shutting a vent opening tightly and rattle-free in its close position may be opened quickly and at the right time.

According to a first aspect of the present invention, a vehicle ventilation module for allowing air to exhaust from the inside of a vehicle compartment is provided which comprises a carrier element to be mounted to the vehicle. The carrier element of the module comprises at least one vent opening for allowing air to exhaust from the inside of a vehicle compartment when the vehicle ventilation module is mounted as intended to the vehicle. Furthermore, the carrier element comprises at least one flap being pivotable about a swivel axis at the carrier element between a close position and an open position, wherein the vent opening is covered by the flap in the close position and is at least partially uncovered by the flap in the open position so that air may flow through the vent opening. Additionally, the carrier element comprises an actuating mechanism coupled to the flap for pivoting the flap about its swivel axis from the dose position to the open position, wherein the actuating mechanism is actuated to pivot the flap to the open position by an (electric) current applied to the actuating mechanism.

Consequently, the actuating mechanism is electronically controlled and electrically driven. By the use of an electric current (this could also mean a signal), the movement of the flap about its swivel axis from its close position to its open position may be carried out more effectively and with significantly increased power. This allows tightly shutting and even sealing the vent opening by the flap in its close position still ensuring an opening of the flap with adequate speed.

Furthermore, by controlling the movement of the flap from its close position to its open position due the application of an electric current to the actuating mechanism of the ventilation module an exhaust of air from the inside of the compartment may be enabled at any time and for example even in advance of an increase in air pressure within the vehicle compartment, i.e. preferably at the beginning or before a closing of a vehicle door.

In one embodiment the actuating mechanism is supplied with a current (due to the application of voltage) for pivoting the flap to its open position when a vehicle door is opened. The flap is held in its open position by the actuating mechanism until this vehicle door is or all vehicle doors are closed. For example the flap is (actively) moved to its close position shortly (within 1 to 2 seconds) after the closing of the vehicle door(s).

In order to keep the module as robust and failsafe as possible, it is preferred that the vehicle ventilation module does not comprise its own electronic control electronic or logic but is simply controlled by a control electronics of a vehicle door.

The actuating mechanism is preferably mounted to the carrier element so that the module preassembled with its actuating mechanism may be mounted to the vehicle. In this context it is also preferred that the module includes a connector plug or socket for easily electrically coupling the module with a power supply and/or an electronic controlling unit of the vehicle after/upon mounting the module to the vehicle as intended. For example, the module may be placed in an aperture of a body panel of the vehicle, preferably near or in a door of the vehicle, and be connected to a power supply and/or an electronic controlling unit before or after the module is placed in the aperture by plugging a connector for the power supply to a connector portion of the module defining a socket for the connector.

In one embodiment the actuating mechanism comprises an electric or magnetic drive device for pivoting the flap from its close position to its open position. In case of an electric drive device, an electric driving motor drives a flap to its open position. In such an embodiment it may be possible that the electric driven motor also drives the flap from the open position to the close position upon a corresponding closing signal or upon application of a reverse voltage compared to a voltage applied for driving the flap to its open position.

For the sake of a compact design an electric driving motor may at least partially accommodated in a housing part formed in the carrier element. For example, the housing part defines a recess in the carrier element into which the electric driving motor is to be placed.

For protecting the electric driving motor from dirt, water and damages, the electric driving motor may be covered by a cover in which the electric driving motor is at least partially accommodated. Such cover forms a (further) housing part for the electric driving motor at the carrier element of the vehicle ventilation module. Preferably, the cover for the electric driving motor is clipped to the carrier element in order to provide for a quick assembly of the module without the need to use tools.

The cover may also integrate a connector portion defining a socket for a connector plug by means of which the actuating mechanism is connected to a power supply and/or to an electronic controlling unit of the vehicle.

For transmitting a driving force generated by an electric driving motor to the at least one flap a vehicle ventilation module preferably comprises a transmission mechanism between the electric driving motor and the flap(s). Such a transmission mechanism may comprise a gearing mechanism and/or a lever arrangement for transmitting the driving force from the electric driving motor.

In one embodiment a gearing mechanism of the transmission mechanism comprises at least two gears meshing with each other for transmitting the driving force, a first gear being pivotable about a gearing axis. The first gear may be for example connected to an axle journal of the flap so that a pivoting movement of the first gear about its gearing axis causes the flap to pivot. The gearing axis of the first gear and the swivel axis of the flap may coincide.

In one variant, the first gear has a teeth portion at its circumference with teeth for meshing with at least one second gear of the gearing mechanism, the teeth portion of said first gear solely circumferentially extending at the most 180° about the gearing axis, in particular at the most 90°. Here, the first gear may be a so-called semi-gear which has gearing teeth solely along a part of a circular path around the gearing axis. In a side view such semi-gear thus may have the contour of a circular sector. By using such kind of first gear, the maximum turning about the gearing axis and hence the maximum swivel movement of the flap about its swivel axis may be easily limited if the first gear is used as the driven gear of the gearing mechanism.

The first gear may be a semi-gear whose teeth portion solely extends 90° about its gearing axis in order to restrict the maximum pivoting angle for the at least one flap about its swivel axis from its close position to its open position. The maximum pivoting angle here is approximately 90°.

In another embodiment the transmission mechanism comprises a lever arrangement for transmitting the driving force from an electric driving motor to the at least one flap. The lever arrangement comprises at least one driving lever directly connected to a drive shaft of the electric driving motor. The lever arrangement further comprises at least one transmission lever connected to the driving lever in order to transmit a displacement of the driving lever to the at least one flap.

In one embodiment of a vehicle ventilation module having a lever arrangement for transmitting a driving force from the electric driving motor, the carrier element comprises several vent openings for allowing air to exhaust from the inside of a vehicle compartment and several pivotable flaps each signed to a single vent opening for covering it in a respective close position. The several flaps are coupled to a single electric driving motor of the actuating mechanism via the lever arrangement. The coupling between the flaps and their single electric driving motor here allows for pivoting all flaps synchronously from their respective close position to their respective open position upon activation of the electric driving motor by applying an electric current to it so that its drive shaft is turned.

The lever arrangement in this embodiment comprises a single driving lever fixed to the drive shaft and thus connected to the electric driving motor. The lever arrangement further comprises at least one displaceable transmission lever which is mounted and connected to the driving lever in such a way that a swivel movement of the driving lever results in a longitudinal (translational) displacement of the transmission lever. Preferably, an elongated transmission lever is held within the lever arrangement so that it may be moved longitudinally along its direction of extent relative to the carrier element when the driving lever is swiveled about a driving axis of the electric driving motor which driving axis is defined by drive shaft of the electric driving motor. In order to drive the flap of the module to a swivel movement about its swivel axis on the basis of a longitudinal movement of the transmission lever, the lever arrangement of a preferred embodiment additionally comprises a second transmission lever at the carrier element. The second transmission lever is fixed to at least one flap and is pivotable about the swivel axis of this flap and the two transmission levers are connected to each other in such a way that a longitudinal movement of the first transmission lever results in a swivel movement of the second transmission lever causing the corresponding flap to pivot. At a first end, the second transmission lever is hinged to the first transmission lever and at its other second end the second transmission lever is swivel-mounted to the carrier element. For this purpose, the carrier element preferably includes a bearing portion defining a pivot bearing for the second transmission lever and for the at least one flap coupled to the second transmission lever.

In an embodiment with several flaps it may be advantageous to provide a lever arrangement for driving several flaps with just one single electric driving motor. Here, the lever arrangement comprises in addition to a first transmission lever, connected to the driving lever, at least two further, second transmission levers at the carrier element, wherein each second transmission lever is fixed to at least one flap and is pivotable about the swivel axis of the corresponding flap. The first transmission lever is connected to both second transmission levers in such a way that a longitudinal movement of the first transmission lever results in a swivel movement of the two second transmission levers causing their corresponding flaps to pivot.

In the case of several flaps at one carrier element, it is preferred that at least two flaps are arranged at the carrier element, one after the other along a common swivel axis. At least two flaps are thus arranged in a row along a common swivel axis covering at least two separate vent openings. In one embodiment, at least two pairs of flaps are arranged at the carrier element in parallel to each other so that a first common swivel axis of one pair of flaps runs parallel to a second common swivel axis of another pair of flaps. By means of a lever arrangement coupling the two pairs of flaps with an electric driving motor, the four flaps in such a vehicle ventilation module may be moved synchronously between their close positions and open positions selectively upon activation of a single electric driving motor.

In another embodiment of a vehicle ventilation module, the activating mechanism comprises a magnetic drive device with at least one conductor element and one magnetic element, the conductor element generating a first magnetic field when supplied with a current and the magnetic element generating an (opposing) second magnetic field. The conductor element and the magnetic element are configured and mounted in such a way at the carrier element that upon generation of the first magnetic field, at least one of the conductor element and the magnetic element is displaced and drives the flap about its swivel axis.

It is possible that the magnetic element is stationary, for example fixed to the carrier element via a holding part, and that the conductor element is displaceable, preferably pivotable. The flap(s) to be pivoted is (are) coupled to the conductor element. The conductor element and the magnetic element are here configured and arranged in such a manner that the conductor element is automatically displaced (rotated) due to the magnetic forces of the first and the second magnetic field when a current is applied to the conductor element, thereby pivoting the flap(s) about the swivel axis. The magnetic element can comprise a permanent magnet or an electromagnet so that in the latter case the magnetic element generates the second magnetic field also solely upon voltage application.

The conductor element may be arranged on a rotatable sleeve supported at the carrier element. The conductor element may be a conducting wire wound around the rotatable sleeve like a solenoid and secured to the rotatable sleeve so that the sleeve turns together with the conductor element (the conductor element and the sleeve are mounted to co-rotate). The flap(s) to be pivoted may be coupled to the conductor element via the rotatable sleeve by an axle journal of the flap being plugged into a shaft opening of the sleeve.

Instead of or in addition to causing a flap to return to its close position with the aid of an electric driving motor or a reverse first magnetic field at least one elastic component may be provided at the carrier element biasing the flap towards its close position. By means of the at least one elastic component, the flap has to be pivoted from its close position to its open position against a resilient force of the elastic component. Hence, the movement of the flap to its close position is at least facilitated and/or accelerated (compared to an embodiment without such an elastic member). Furthermore, the flap may be (additionally) held in its close position by means of the elastic member.

In one embodiment, the elastic member may be a part of a non-electrical flap return mechanism for automatically moving the flap to its close position when a current is not or no longer applied to the actuating mechanism. With the aid of the at least elastic member (and in some cases, depending on the orientation of the module with the aid of gravity) the flap will hence be returned to its close position due to the resiliency of the elastic member without the necessity of applying a current to the actuating mechanism, in particular without the need of applying a current to an electric driving motor of an electric drive device or applying a (reverse) current to a conductor element of a magnetic drive device.

Preferably, the carrier element and/or a cover for an electric driving motor is a molded part and at least one wire element for applying current to the actuating mechanism is embedded in this molded part. Embedded in this context means that the wire element is (completely) surrounded by material forming the respective molded part. The at least one wire element is thus already arranged in a liquid or a viscous molding material before the molding material hardens. Due to this integration of a wire element into the carrier element and/or a cover for the electric driving motor in the manufacturing process a connector portion including the wire element for electrically connecting the actuating mechanism with a power supply and/or electronic controlling unit of the vehicle may be easily formed at the carrier element or the cover and the assembly of the vehicle ventilation module may be facilitated.

The wire element may be a conventional lead wire or a sheet metal pin or any other electrically conductive part.

A further aspect of the present invention is a vehicle ventilation device for allowing air to exhaust from the inside of a vehicle compartment, the device comprising a carrier element mounted to the vehicle and the carrier element comprising at least one vent opening for allowing air to exhaust from the inside of the vehicle compartment and at least one flap being pivotable about a swivel axis at the carrier element between a closed position and an open position. In the closed position the vent opening is covered by a flap and in the open position the vent opening is at least partially uncovered by the flap so that air may flow through the vent opening. The vehicle ventilation device further comprises an actuating mechanism coupled to the flap for (selectively) pivoting the flap about its swivel axis from its closed position to the open position the actuating mechanism being actuated to pivot the flap to the open position by applying a current to the actuating mechanism.

BRIEF DESCRIPTION OF THE DRAWINGS

The previously mentioned and other advantages of the present invention will be apparent to those skilled in the art upon consideration of the following specification and the attached drawings.

FIGS. 1A to 1E are different views of a first embodiment of a vehicle ventilation module according to the present invention with a single flap pivoted by means of actuating mechanism having an electric drive device with an electric driving motor;

FIG. 2A is an enlarged perspective view of an actuating mechanism of the ventilation module of the first embodiment;

FIGS. 3A to 3D show different views of a second embodiment of a vehicle ventilation module according to the present invention with four flaps to be moved by a single electric driving motor coupled to the four flaps via a lever arrangement;

FIGS. 4A and 4B show in greater detail a part of the actuating mechanism of the vehicle ventilation module of the second embodiment with its electric driving motor and its lever arrangement;

FIGS. 5A to 5C show different views of a third embodiment of a vehicle ventilation module according to the present invention with a single flap driven by a magnetic drive device comprising a conducting wire and a permanent magnet;

FIGS. 6A and 6B show different views of a carrier element of the vehicle ventilation module according to the third embodiment;

FIG. 7E shows a holding clip of the magnetic drive device;

FIG. 7F shows an arched permanent magnet of the magnetic drive device which permanent magnet is to be held at the carrier element of FIGS. 6A to 6B by the holding clip of FIG. 7E;

FIG. 8 shows a perspective view of the flap for the vehicle ventilation module according to the third embodiment.

DESCRIPTION OF PREFERRED EMBODIMENTS

Figure 1B:
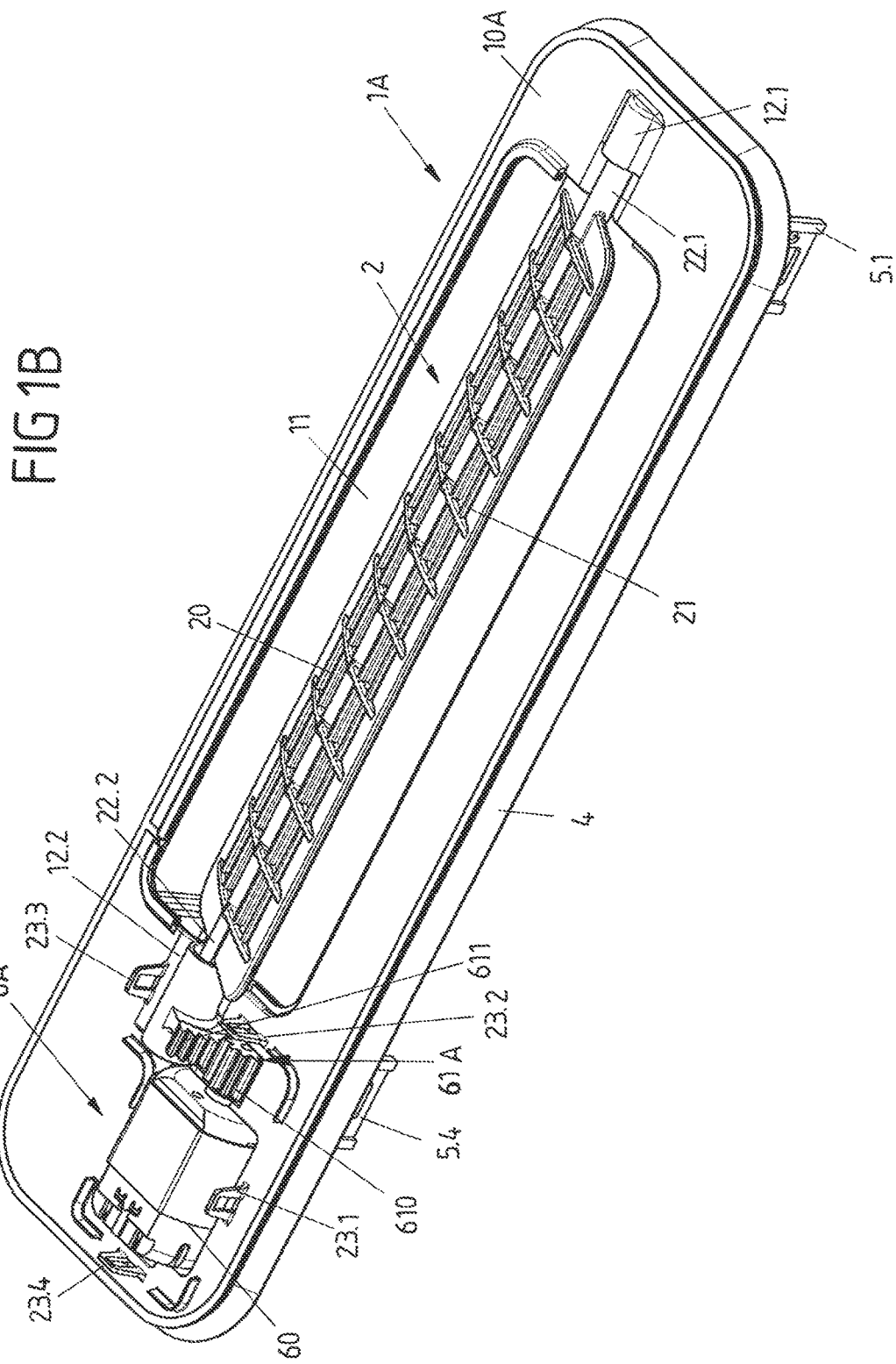

The accompanying drawings show three different embodiments of a vehicle ventilation module 1A, 1B and 10 according to the present invention in which a flap 2 (1st embodiment), 2' (2nd embodiment) or several flaps 200a to 200d (3rd embodiment) are swivel mounted to a carrier element in the form of a carrier frame 10A, 10B or 10C. The flap(s) 2, 2' or 200a to 200d is (are) electrically actuated to pivot from a closed position to an open position for allowing air to exhaust from a vehicle compartment through a corresponding vent opening 11, 11C or corresponding vent openings 11a to 11d, respectively.

FIGS. 1A to 1E and 2A to 2B show a first embodiment of a vehicle ventilation module 1A which comprises a carrier frame 10A carrying a flap 2 for selectively covering or uncovering a vent opening 11 in the carrier frame 10A and an actuating mechanism 3A for pivoting the flap 2 about its swivel axis at the carrier frame 10A. The vehicle ventilation module 1A is preassembled with its flap 2 and the actuating mechanism 3A so that it may be placed in an aperture of a vehicle's body panel and afterwards just has to be connected to a power supply and/or a controlling unit for electronically controlling the movement of the flap 2. The carrier frame 10A includes several fastening elements in the form of fastening clips 5.1 to 5.4 for fastening the ventilation module 1A to the body panel by just clipping the carrier frame 10A into the assigned aperture of the body panel.

As can be seen from FIG. 1C the carrier frame 10A is also provided with rips 100 at its bottom side in order to increase the stiffness of the carrier frame 10A.

For sealing the body panel's aperture when the ventilation module 1A is placed as intended into it, a rubber sealing lip 4 is provided at a circumference of the carrier frame 10A. The rubber sealing lip 4 continuously extends along the circumference of the carrier frame 10A. The rubber sealing lip 4 may be molded to the carrier frame 10A in a 2-components molding process.

The carrier frame has a base of rectangular shape and is relatively flat and thin-walled so that it extends substantially along a plane. The thus plate-like carrier frame 10A comprises a rectangular shaped vent opening 11 which may be completely covered by the flap 2 in a close position of the flap 2 preventing transmission of noise and flow of air from the exterior of a vehicle into a passenger compartment through the vent opening 11. The flap 2 having a plane middle section 20 with a rip structure 21 on both sides in order to increase the stiffness of the flap 2. The flap 2 further includes two axle journals 22.1 and 22.2 which are pivotably supported in bearing portions 12.1 and 12.2 of the carrier frame 10A so that the flap 2 may be pivoted about a swivel axis defined by the two axle journals 22.1 and 22.2.

The actuating mechanism 3A for pivoting the flap 2 between its close position and open position for permitting a fluid communication between a passenger compartment and the atmosphere is mounted to the carrier frame 10A and is coupled to one axle journal 22.2 of the flap 2. The actuating mechanism 3A comprises an electric driving motor 60 and a gearing mechanism 61A to transmit a driving force of the electric driving motor 60 to the flap 2.

The electric driving motor 60 and the gearing mechanism 61A are partially accommodated in a housing part formed by a housing portion 24 of the carrier element 10A and partially accommodated in an additional housing part formed by a cover 30 clipped to the carrier frame 10A. The housing portion 24 of the carrier frame 10A includes several adjoining recesses formed in the carrier frame 10A into which the electric driving motor 60 and the components of the gearing mechanism 61A are mounted. The cover 30 covers the electric driving motor 60 and the gearing mechanism 61A after having been placed in the housing portion 24 in order to protect them from dirt or water. Furthermore, grease for lubricating the gearing mechanism 61A may be protected from contamination (e.g., in the form of dirt, water or particles) by the cover 30. For the ease of assembly without the necessity of using tools the carrier frame 10A comprises several cover clips 23.1 to 23.4 each corresponding to a snap hook at the cover 30 so that the cover 30 may be just clipped to the carrier frame 10A.

The electric driving motor 60 and the gearing mechanism 61A are parts of an electric drive device 6A for selectively pivoting the flap 2 (if required) independently from an increase in air pressure in the vehicle compartment. The electric driving motor 60 may rotate a drive gear 610 of the gearing mechanism 61A. The drive gear 610 mounted to a driving shaft of the electric driving motor 60 meshes with a further gear 611 of the gearing mechanism 61A. The further gear here is a driven semi-gear 611 having a sleeve like attachment portion 6110 for connecting the semi-gear 611 to the axle journal 22.2 of the flap 2 (see for example FIGS. 1B, 1D and 2B). A square end portion of the axle journal 22.2 is positively fitted in a shaft opening of the attachment portion 6110. The semi-gear 611 has a teeth portion with teeth for meshing with the drive gear 610 the teeth portion just extending along a part of a circular path around a gearing axis of the semi-gear 611 defined by its attachment portion 6110. The teeth portion of the semi-gear 611 here just extends about 90° about the gearing axis. This gearing axis coincides with the swivel axis of the flap 2, since the axle journal 22.2 of the flap is plugged into a shaft opening of the attachment portion 6110 of the semi-gear 611. The semi-gear 611 serves as a stop for the open and the closed position of the flap 2 since a further rotation of the semi-gear 611 by the drive gear 610 is not possible to due to the design of the semi-gear 611. Due to the use of a semi-gear 611 a pivotable movement of the flap 2 is thus mechanically restricted to a defined maximum opening angle.

The cover 30 comprises a bearing portion 32.2 which together with the bearing portion 12.2 of the carrier frame 10A forms a sleeve or bush bearing for the attachment portion 6110 and the axle journal 22.2 fixed therein. The bearing portion 12.2 of the carrier frame 10A and the bearing portion 32.2 of the cover 30 each have a channel-like concave recess to constitute a half shell for supporting the cylindrical attachment portion 6110 of the driven semi-gear 611 so that constitute a bush or sleeve for bearing after the cover 30 was clipped to the carrier frame 10A.

Figure 2B:
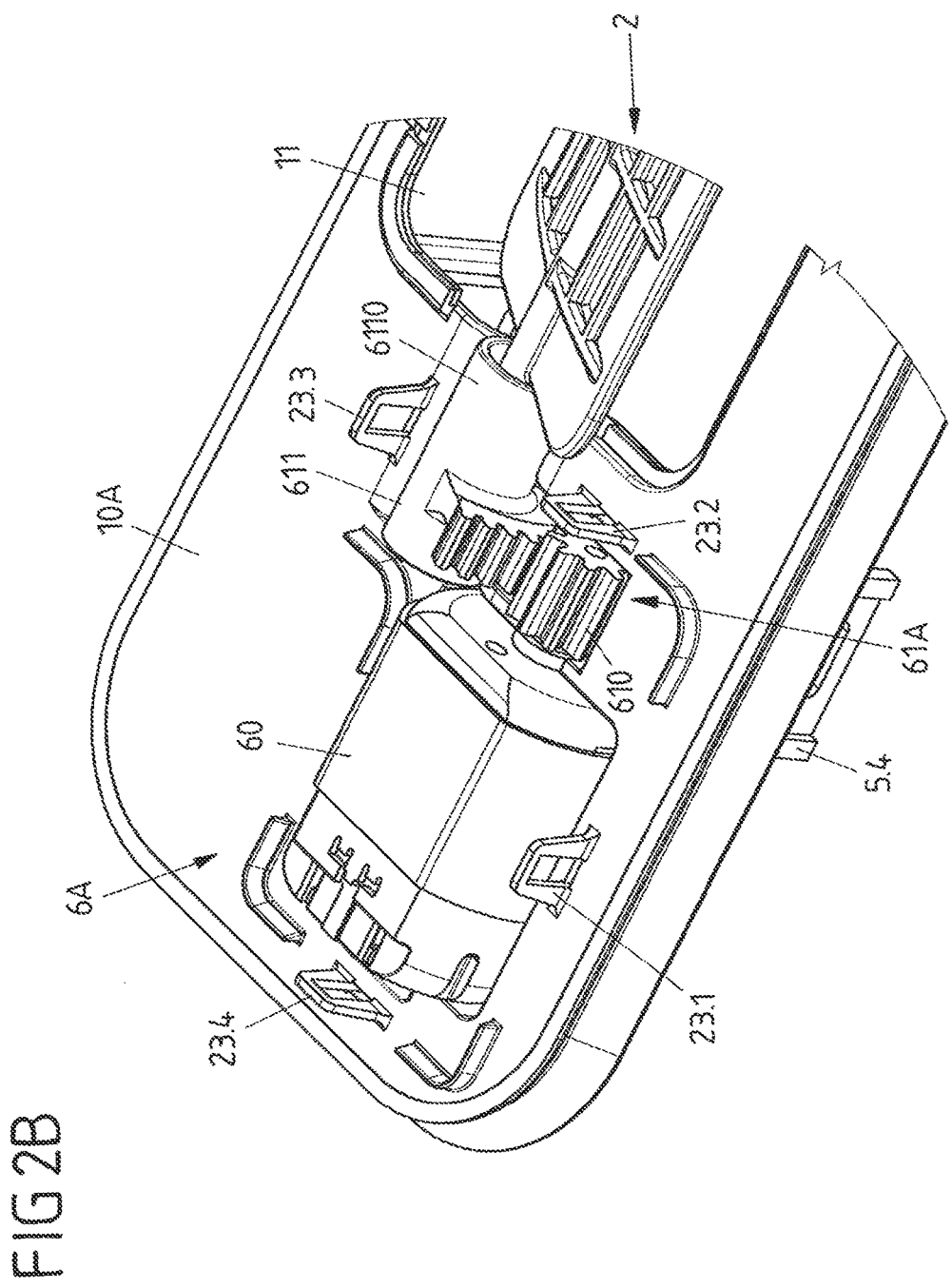
FIG. 2B shows the actuating mechanism of FIG. 2A in greater detail without a cover covering an electric driving motor and a gearing mechanism.
Figure 3D:
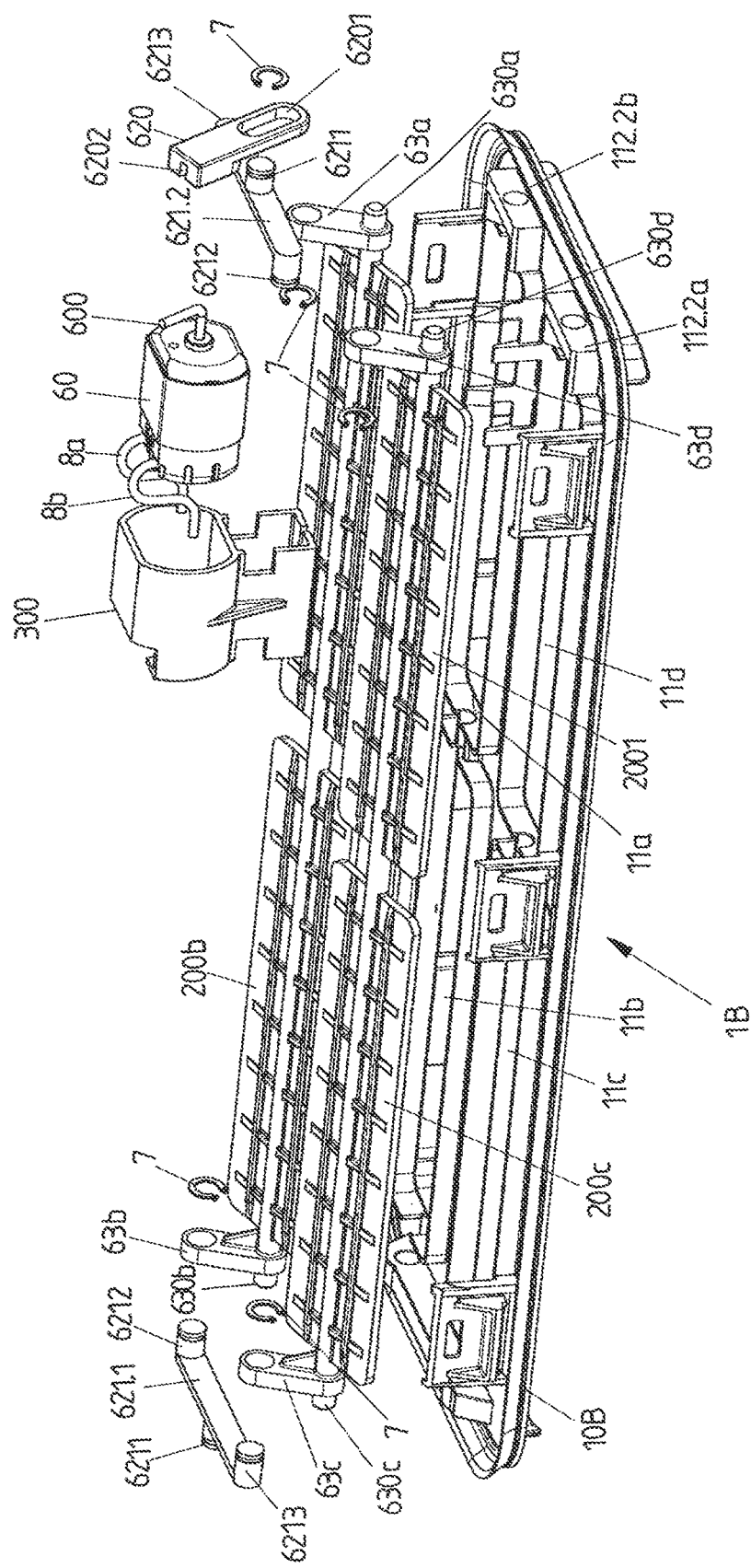

As can be seen in FIGS. 2A and 2B the electric driving motor 60 is to be connected to a power supply of the vehicle via a connector portion 31 integrated in the cover 30. This connector portion 31 has wire elements in the form of sheet metal pins embedded in the material forming the connector portion 31. The sheet metal pins embedded in the cover 30 for electrically contacting the electric driving motor 60 each project with a pin-like end portion from an upper inner surface in the interior of the cover 30 so that these pin-like end portions of the sheet metal pins are in each case plugged into the electric driving motor 60 when the cover 30 is mounted to the carrier frame 10A. Accordingly, the sheet metal pins are automatically electrically connected with the electric driving motor 60 when the cover 30 is clipped to the carrier frame 10A and latched in its position by the cover clips 23.1 to 23.4. The vehicle ventilation module 1A preassembled with the actuating mechanism 3A including the cover 30 may thus be placed in an aperture of the body panel of the vehicle and its electric driving motor 60 may be easily connected to a power supply of the vehicle by plugging a connector to the connector portion 31.

For operation the electric driving motor 60 may be supplied with a current to rotate the drive gear 610 thereby turning the driven semi-gear 611 (preferably about approximately 90° at the most). The semi-gear 611 is fixed to the axle journal 22.2 so that the flap 2 turns together with the driven semi-gear 611. Thus the flap 2 may be pivoted from a close position to the open position shown in FIGS. 1A, 1B, 1C and 2A to 2B. When the drive gear 610 is rotated in an opposite direction the flap 2 also may be returned to its close position in which it completely covers the vent opening 11.

By using an electric drive device 6A with an electric driving motor 60 the flap 2 may be opened every time and in every situation to reduce air pressure in a passenger compartment, for example, before a vehicle door may be slammed. The application of current to the electric driving motor 60 may be controlled by a vehicle door controlling unit which actuates the electric driving motor 60 to drive the flap 2 to its open position when a vehicle door is opened. When this door or all vehicle doors are closed the flap 2 is driven back to its closed position so that no noise, water or animals may enter the vehicle compartment via the vent opening 11.

As can be seen from the exploded views of FIGS. 1D and 1E the whole vehicle ventilation module 1A of the first embodiment may be assembled without any additional fastening material like glue, screws or bolts. Rather the various components of the ventilation module 1A may be easily assembled by just plugging them together and mounting them to the predefined spaces on the carrier frame 10A where they are supported and—as regards the gears 610, 611 and the flap 2—are pivot-mounted.

In FIGS. 3A to 3D and 4A to 4B a second embodiment of a vehicle ventilation module 1B according to the present invention is shown in different views. In the second embodiment a plate-like carrier frame 10B again comprises several—here six—fastening clips 5.1 to 5.6 for securely fastening the vehicle ventilation module 1B to a vehicle body panel. Again, the fastening clips are positioned near a longer, longitudinal side of the carrier frame 10B. Furthermore, like in the first embodiment, a rubber seal 4 is provided at a circumference of the carrier frame 10B in order to seal the aperture in the body panel when the vehicle ventilation module 1B is correctly mounted to the vehicle.

In contrast to the first embodiment the vehicle ventilation module 18 comprises several flaps 200a to 200d each assigned to a single one of four venting openings 116 to 11d provided in a carrier frame 10B. An actuating mechanism 3D of this ventilation module 1B comprises an electric drive device 6B with a single electric driving motor 60 and a lever arrangement 61B. The drive device 6B with its electric driving motor 60 and its lever arrangement 61B is mounted to the carrier frame 10B in order to pivot the four flaps 200a to 200d synchronously about two parallel swivel axes.

The flaps 200a to 200d are arranged in pairs at the carrier frame 10B so that a first pair of flaps 200a and 200b may be swivelled about a first common swivel axis parallel to a second swivel axis of second pair of flaps 200c and 200d. The flaps 200a and 200b are arranged one after the other along the first common swivel axis which runs parallel to the second common swivel axis about which the other pair of flaps 200c and 200d may be swivelled. The two elongated flaps 200a, 200b or 200c, 200b of a pair of flaps extend along a longer (longitudinal) side of the rectangular carrier frame 10B and are supported at the carrier frame 10B at bearing portions 112.1 and 112.2a, 112.2b of the carrier frame 10B. One bearing portion 112.1 extends along a first shorter (transverse) side of the carrier frame 10B and comprises two shaft openings for supporting one axle journal 630b of the first pair of flaps 220a, 200b and one axle journal 630c of the second pair of flaps 200c, 200d. At the other end of the carrier frame 10B near a second shorter (transverse) side of the carrier frame 108 an axle journal 630a of the first pair of flaps 200a, 200b is supported in a shaft opening of the bearing portion 112.2b and an axle journal 630d of the second pair of flaps 200c, 200d is supported in a shaft opening of the other bearing portion 112.2a.

At each of the four axle journals 630a to 630d a second transmission lever 63a to 63d of the lever arrangement 618 is fixed so that a swivelling of the respective second transmission lever 63a, 63b, 63b or 63d results in a swivel movement of the corresponding pair of flaps 200a, 200b or 200c, 200d. At each end of the two pairs of flaps 200a, 200b or 200c, 200d two second transmission levers 63a, 63d and 63b, 63c are connected to each other by means of a first transmission lever 621.1 or 621.2 extending along the shorter side of the carrier frame 10B and transversely to the two swivel axes of the flaps 200a to 200d. Each of the second transmission levers 63a to 63d is hinged to the respective first transmission lever 621.1 or 621.2. Each first transmission lever 621.1, 621.2 comprises two cylindrical lateral connection pins 6212 and 6213 each lateral connection pin 6212, 6213 reaching through a hole at one of the second transmission levers 63a to 63d. A first transmission lever 621.1 at a first (left) end of the carrier frame 10B connects the second transmission levers 63b and 63c with each other by reaching with a first lateral connection pin 6212 through a hole in the second transmission lever 63b and with its second lateral connection pin 6213 through a hole in the second transmission lever 63c. The other first transmission lever 621.1 at the opposite (right) end connects the two second transmission levers 63a and 63d with each other by reaching with a first lateral connection pin 6212 through a hole in the second transmission lever 63d and with a second lateral connection pin 6213 through a hole in the second transmission lever 63a.

The lateral connection pins 6212 and 6213 are axially secured at the respective second transmission levers 63a to 63d by means of a circlip 7. Each circlip 7 secures the corresponding lateral connection pin 6212 or 6213 in the respective through a hole and prevents disconnection of a first transmission lever 621.1 or 621.2 from its corresponding pair of second transmission levers 63a, 63d or 63b, 63c, for example, due to vibration during movement of the vehicle and at the same time allows for a smooth insert of the lateral connection pins 6212, 6213 in the through-holes.

Each of the first transmission levers 621.1 and 621.2 may be displaced longitudinally (translationally) transverse to the swivel axis of the four flaps 200a to 200d and parallel to the shorter side of the carrier frame 108 thereby causing the second transmission levers 63a to 63d to synchronously pivot and thus two also pivot the four flaps 200a to 200d.

Each first transmission lever 621.1 or 621.2 with its pair of second transmission levers 63a, 63d or 63b, 63c constitutes a lever arrangement unit 61.1 or 61.2 coupled to one of the longitudinal ends of the two swivel axes of the four flaps 200a to 200d. At one end the ever arrangement unit 61.2 is furthermore coupled with an electric driving motor 60 to drive the four flaps 200a to 200d synchronously from a close position to an open position and vice versa. The electric driving motor 60 is accommodated in a housing part with a cover 300 mounted to the carrier frame 10B and projecting from it. The housing part with the cover 300 is fixed to the carrier frame 10B between the two neighboring vent openings 11a and 11d which belong to the two flaps 200a, 200d to be pivoted about two different, parallel swivel axes.

For transmitting a rotational movement of a drive shaft 600 of the electric driving motor 60 to the first transmission lever 621.1 and to convert the rotational movement of the driving shaft to a longitudinal movement of the first transmission lever 621.2 a driving lever 620 is connected to the driving shaft 600 and the first transmission lever 621.2. The driving lever 620 comprises a shaft support 6202 in which a bent end portion of the driving shaft 600 is accommodated in a positively locking manner so that a rotation of the driving shaft 600 results in a rotation of the driving lever 620. The driving lever 620 furthermore comprises an elongated guiding hole 6201 in which a central connection pin 6211 of the first transmission lever 621.2 is guided so that the central connection pin 6211 may slide along the elongated guiding hole 6201 when the driving lever 620 is turned. The central connection pin 6211 is situated in the middle between the two lateral connection pins 6212 and 6213 and projects transversely with respect to a direction of extent of the first transmission lever 621.2. Upon application of a current to the electric driving motor 60 its drive shaft 600 and thus the driving lever 620 are turned clockwise or counter-clockwise. Thereby the central connection pin 6211 slides along the elongated guiding hole 6201 causing a longitudinal movement of the first transmission lever 621.1. Due to the longitudinal movement of the first transmission lever 621.2 the second transmission levers 63a and 63d connected to it will be swivelled causing the two pairs of flaps 200a, 200b and 200c, 200d to pivot synchronously in order to cover or uncover their corresponding vent openings 11a to 11d.

In order to keep the electronic controlling of the electric driving motor 60 as simple as possible the connection between the driving lever 620 and the first transmission lever 621.2 via the elongated guiding hole 6201 and the central connection in 6211 designed in such a way that the turning of the driving lever 620 is mechanically limited. This means that the driving lever 620 may not fully rotate but may just be turned approximately less than 180° in total, in particular less than 90° and preferably less than 50°. Hence, the maximum pivoting angle of the flaps 200a to 200d is defined by the lever arrangement 61B, in particular by the lengths of the elongated guiding hole 6201 of the driving lever 620.

Application of a current to the electric driving motor 60 of the electric actuating mechanism of the second embodiment is enabled by two wire elements in the form of lead wires 8a and 8b at the electric driving motor 60. To these lead wires 8a, 8b a power supply of a vehicle may be connected before or after the preassembled vehicle ventilation module 1B is placed in an aperture of a vehicle's body panel so that the pivoting of its four flaps 200a to 200d may be controlled electronically.

In FIGS. 5A to 5C a third embodiment of a vehicle ventilation module 10 according to the present invention is shown. Details of components of this third embodiment are shown in FIGS. 6A to 6C, 7A to 7F and 8.

In the third embodiment vehicle ventilation module 10 is again provided with a single flap 2' swivel-mounted at a plate-like carrier frame 10C. The carrier frame 10C again defines a rectangular-shaped vent opening 11C to be covered by the flap 2' in its close position.

In contrast to the aforementioned ventilation modules 1A and 18, the ventilation module 1C comprises an actuating mechanism 3C with a magnetic drive device 6C actuated and controlled by an electric current. The actuating mechanism 3C comprises a drive device 6C completely accommodated in a housing portion 24' of the carrier frame 10C. The housing portion 24' defines a recess in the carrier frame 10C into which the components of the drive device 6C are installed. The drive device 6C comprises a holding pad in the form of a holding clip 601C (see FIG. 7A), an arched permanent magnet 60C (see FIG. 7F) held in the recess of the housing portion 24' by the holding clip 601C, a conductor bushing 610 (see FIG. 7O) pivotably supported at the carrier frame and a conducting wire 610C (see FIG. 7C) wound like a solenoid around the conductor bushing 61C.

The holding clip 601C comprises two snap portions 6010Ca and 6010Cb with snap hooks to be inserted in through holds 246a and 246b at the bottom of the housing portion 24' (see FIG. 6B). The holding clip 601C furthermore comprises two hook-shaped holding portions 6011Ca and 6011Cb protecting perpendicularly from a concave basis of the holding clip 601C and being inclined to each other. The holding clip 601C is configured such that the hook-like holding portions 6011Ca and 6011Cb extend in the recess of the housing portion 24' under an angle of about 45° with respect to a plane defined by the carrier frame 10C when the holding clip 601C is fitted by the snap portions 6010Ca and 6010Cb to the housing portion 24'. The holding portions 6011Ca and 6011Cb are resilient and configured such that the permanent magnet 60c may be held tightly by means of the two holding portions 6011Ca and 6011Cb with a concave surface 600C of the permanent magnet 600 facing away from the bottom side of the housing portion 24'.

Facing the concave surface 600C of the permanent magnet 60C, the cylindrical conductor bushing 610 is mounted to the carrier frame 10C so that the conducting wire 6010C wound around a middle support section 6100C of the conductor bushing 610 extends along the concave surface 600C. The conductor bushing 61C is swivel-mounted at the carrier frame 10C the conductor bushing having an cylindrical pivot portion at its end which rests in a concave bearing recess of the housing portion 24'.

The permanent magnet 60C generates a constant magnetic field and forms a stationary part of the magnetic drive device 6C. The conducting wire 610C may be supplied with an electric current so that the conducting wire 610C generates its own magnetic field opposing the magnetic field of the permanent magnet 60C. Upon generation of the opposing magnetic field by the conducting wire 610C, magnetic forces are generated forcing the conducting wire 610C to turn. Since the conducting wire 610C is fixed to the conductor bushing 61C, the conductor bushing 610 is turned with it. An axle journal 22.2' of the flap 2' with a square end portion is mounted in a shaft opening 6101C of the conductor bushing 610 so that upon turning of the conductor bushing 61C the flap 2' is pivoted from its close position shown in FIGS. 5A to 5C to its open position. As long as the current is applied to the conducting wire 610C and flows through the conducting wire 610C, the magnetic field opposing the magnetic field of the permanent magnet 60C is maintained and the flap 2' is held at an opening angle of about 45° to the carrier frame 10C thereby keeping the vent opening 11C open to allow air to flow through the vent opening 11C.

Figure 7B:
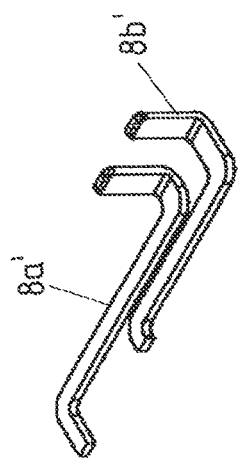
FIG. 7B shows wire elements to be embedded in the carrier element of FIGS. 6A and 6B.
Figure 7D:
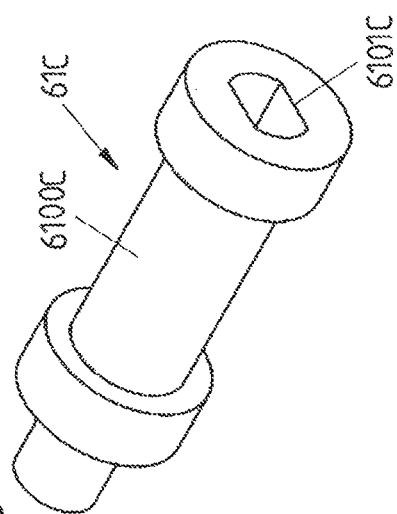
FIG. 7D shows a sleeve defining a conductor bushing for the conducting wire of FIG. 7C.
Figure 7A:
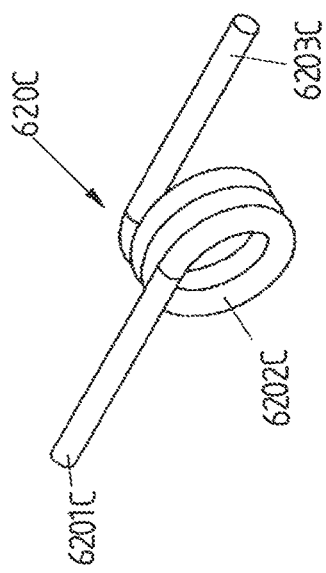
FIG. 7A shows a torsion spring as an elastic member being a part of a non-electrical flap return mechanism in the module of the third embodiment.
Figure 7C:
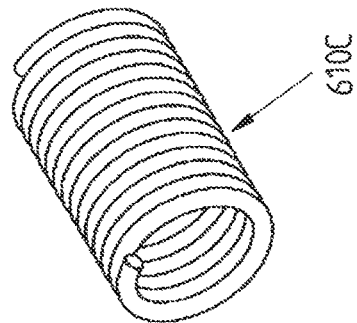
FIG. 7C shows a spiral conducting wire of the magnetic drive device of the ventilation module according to the third embodiment.

The application of an electric current to the conducting wire 610C is enabled by two wire elements in the form of sheet metal pins 8a' and 8b' embedded and integrated in the carrier frame 10C. The two sheet metal pins 8a' and 8b' shown in FIG. 7B are co-molded into the plastic carrier frame 10C and extend from a connector portion 31' at the carrier frame 10C to the housing portion 24' and to the conducting wire 610C. End portions of the sheet metal pins 8a' and 8b' project perpendicularly with respect to the plane defined by the carrier frame 10C within the connector portion 31' so that the sheet metal pins 8a' and 8b' may be easily connected to a power supply of the vehicle by plugging a connector to the connector portion 31'.

A maximum swivel angle and maximum swivel movement of the flap 2' about its swivel axis, which is defined by a bearing portion 12.1 at the carrier frame 10C and the conductor bushing 61C supported in the housing portion 24', is given by an elastic member in the form of a torsion spring 620C mounted to the axle journal 24.1 of the flap 2' supported in the bearing portion 12.1 opposite to the drive device 6C. The torsion spring 620C forms a non-electric return mechanism for the flap 2' and abuts with its two ends at an upper surface of the carrier frame 10C. Upon pivoting the flap 2' about its swivel axis, the torsion spring 620C is rotated with the flap 2' thereby moving one end of the torsion spring 620C against a resilient force towards the other end, which still rests at the carrier frame 10C, so that the torsion spring 620C is further biased. A pivoting of the flap 2' from its close position in which it completely covers the vent opening 11C to its open position thus increases a torque acting on the flap 2' by means of the torsion spring 620C which biases the flap 2' towards its close position. The torsion spring 620C and the magnetic drive device 6C are configured such that the magnetic forces driving the flap 2' towards its open position against a resilient force of the torsion spring 620C are just high enough to pivot the flap 2' about a maximum angle of approximately 45°. When a voltage is no longer applied to the conducting wire 610C (the conducting wire 610C being no longer supplied with an electric current), the flap 2' is automatically returned to its close position due the resilient force of the torsion spring 620C. Hence, neither a motor nor actuator is needed to move the flap 2' back to its cover position. This further simplifies the controlling of a vehicle ventilation module or device according to the third embodiment of the invention.

Figure 6C:
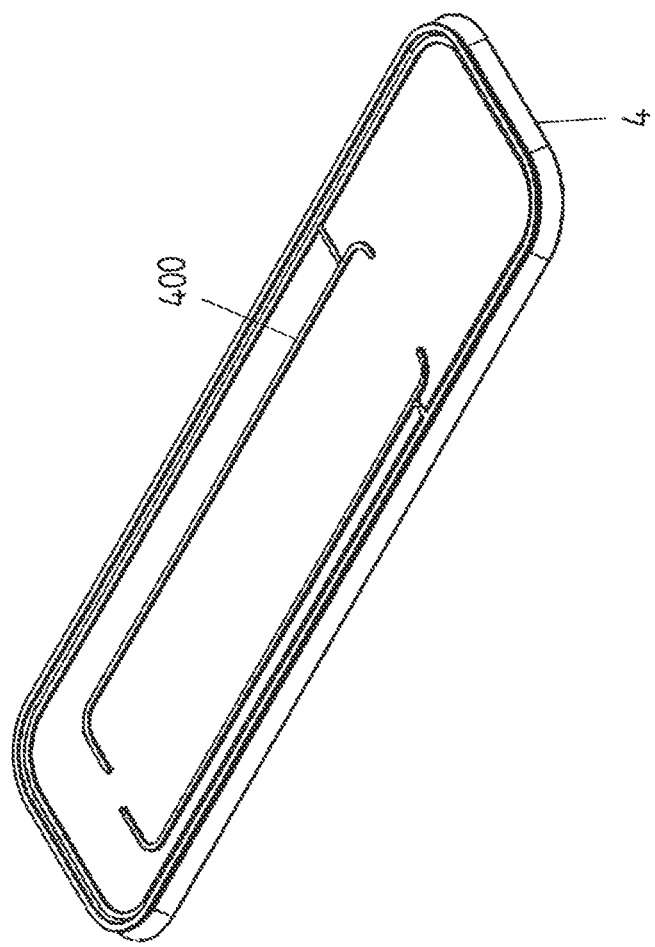
FIG. 6C shows a carrier wire frame defining the outer dimensions of the vehicle ventilation module and its vent opening to which carrier wire frame molding material is to be molded to manufacture the carrier element of FIGS. 6A and 6B.

FIG. 6C shows a carrier wire frame 400 for outlining a possible manufacturing process for a carrier frame 10C (as well as for a carrier frame 10A or 10B). The carrier frame 10C is preferably manufactured by (injection) molding, in particular, by two-component injection molding, so that a relatively rigid carrier wire frame 400 of metal or a first plastic component for defining the outer dimensions of the carrier frame and a corresponding vent opening may be molded with a second component forming a rubber sealing lip 4 and/or bearing, housing and/or connector portions in which also electrically conductive wire elements may be embedded It is apparent from the above description that several aspects of the described three embodiments may be combined with each other, for example a torsion spring of a non-electric return mechanism may be used within a vehicle ventilation module having an electric drive device or a magnetic drive device may be combined with a lever arrangement to pivot several flaps at the same time.

A vehicle ventilation module according to the invention obviates rattling noises during vehicle movements since the flap(s) is (are) closed tightly thereby also preventing noise, water, dirt and small animals from getting into the interior of the vehicle. Since gravity is not necessary to close the flap(s) and to hold the flap(s) in a close position, a vehicle ventilation module of the present invention may be mounted in various positions at a vehicle body panel. Furthermore, the actuating mechanisms described are very robust and reliable and easy to assemble.

Due to the controlling of a pivot movement of the flap(s) by a current applied to the actuating mechanism a ventilation may be controlled more effectively and quicker even in advance of an increase in air pressure within a vehicle compartment.

A vehicle ventilation module with an actuating mechanism having an electric or magnetic drive device may be easily assembled to a vehicle in order to create a vehicle ventilation device making use of the above-described advantages and features of a vehicle ventilation module.

The invention claimed is:
1. A vehicle ventilation module for allowing air to exhaust from an inside of a vehicle compartment, the ventilation module comprising:
 a carrier element having a carrier frame comprising a single substantially planar plate configured to mount the vehicle ventilation module to a vehicle, wherein the carrier frame has an upper side and a bottom side;
 at least two vent openings in the carrier frame for allowing air to exhaust from the inside of the vehicle compartment when the vehicle ventilation module is mounted to the vehicle;

at least four flaps being pivotable about a swivel axis at
the carrier frame between a closed position and an open
position, wherein the vent openings are covered by the
at least four flaps in the closed position and are at least
partially uncovered by the at least four flaps in the open
position so that air may flow through the vent openings;
wherein at least two flaps of the at least four flaps are
arranged at the carrier element sequentially along a first
common swivel axis and at least two other flaps of the
at least four flaps are arranged at the carrier element
sequentially along a second common swivel axis, the at
least four flaps being arranged in pairs at the carrier
frame so that a first pair of two flaps may be swivelled
about the first common swivel axis parallel to the
second swivel axis of a second pair of two flaps;
a plurality of fastening elements at the carrier frame in the
form of fastening clips for fastening the ventilation
module to a body panel of the vehicle, the plurality of
fastening elements being located at the bottom side of
the carrier frame; and
an actuating mechanism coupled to the first and second
pairs of flaps and comprising an electric driving motor
for pivoting the first and second pairs of flaps about
their first and second common swivel axes from the
closed position to the open position, wherein the actu-
ating mechanism is configured to be actuated to pivot
the first and second pairs of flaps to the open position
by a current applied to the actuating mechanism,
wherein the actuating mechanism comprises a transmis-
sion mechanism mechanically connecting the electric
driving motor to the first and second pairs of flaps and
comprising a lever arrangement for transmitting a driv-
ing force from the electric driving motor to the first and
second pairs of flaps such that upon activation of the
electric driving motor all flaps may be pivoted syn-
chronously from the closed position to the open posi-
tion;
wherein the lever arrangement comprises:
a driving lever connected to the electric driving motor;
at least one displaceable transmission lever, wherein the
driving lever is configured to be swivelled by the
electric driving motor about a driving axis and wherein
the driving lever and the at least one transmission lever
are connected with each other such that a swivel
movement of the driving lever results in a longitudinal
movement of the transmission lever; and
at least two second transmission levers at the carrier
element, wherein each second transmission lever is
fixed to at least one flap of one of the first and second
pairs of flaps, and is pivotable about the first or second
common swivel axis of the corresponding first or
second pair of flaps, and wherein the first transmission
lever is connected to each of the second transmission
levers in such way that a longitudinal movement of the
first transmission lever results in a swivel movement of
the two second transmission levers causing their cor-
responding pair of flaps to pivot; and
wherein the actuating mechanism is mounted to a side of
the carrier frame so that the vehicle ventilation module
preassembled with the actuating mechanism and the at
least one flap at the carrier frame is configured to be
mounted to a vehicle only by being clipped by fasten-
ing clips into an aperture of the body panel.

2. The vehicle ventilation module of claim 1, wherein the carrier frames defines a housing part in which the electric driving motor is at least partially accommodated.

3. The vehicle ventilation module of claim 1, wherein the vehicle ventilation module comprises a housing part in which the electric driving motor is at least partially accommodated, the housing part being clipped to the carrier frame.

4. The vehicle ventilation module of claim 1, wherein the transmission mechanism comprises a gearing mechanism having at least two gears meshing with each other for transmitting a driving force of the electric driving motor to the at least one flap.

5. The vehicle ventilation module of claim 4, wherein the transmission mechanism comprises a first gear pivotable about a gearing axis, the first gear having a teeth portion at its circumference with teeth for meshing with at least one second gear of the transmission mechanism, wherein the teeth portion of said first gear solely circumferentially extends at the most 180° about the gearing axis.

6. The vehicle ventilation module of claim 1, wherein the carrier element comprises several vent openings for allow-ing air to exhaust from the inside of a vehicle compartment and respective pivotable flaps each assigned to a respective vent opening for covering the respective vent in the closed position.

7. The vehicle ventilation module of claim 1, wherein the carrier element further comprises at least one elastic com-ponent that biases the flap towards its closed position so that the flap is pivotable from the closed position to the open position against a resilient force of the elastic component.

8. The vehicle ventilation module of claim 1, wherein the carrier element is a molded part and at least one electrically conductive wire element for applying current to the actuat-ing mechanism is embedded in the carrier element.

9. A vehicle ventilation device for allowing air to exhaust from an inside of a vehicle compartment, the ventilation device comprising a vehicle ventilation module of claim 1.

10. A vehicle ventilation module for allowing air to exhaust from an inside of a vehicle compartment, the ventilation module comprising:
a carrier element having a plate in the plane of a plurality of flaps wherein shafts of the plurality of flaps are in a plane of the plate configured to mount the vehicle ventilation module to a vehicle,
a plurality of vent openings for allowing air to exhaust from the inside of a vehicle compartment when the vehicle ventilation module is mounted to the vehicle;
the plurality of flaps each being pivotable about a swivel axis at the plate carrier element between a closed position and an open position and each being assigned to a respective vent opening for covering it in the closed position, wherein the respective vent opening is cov-ered by a flap in its closed position and is at least partially uncovered by the flap in its open position so that air may flow through the vent opening; and
an actuating mechanism coupled to the flaps for pivoting the flaps from the closed position to the open position, wherein the actuating mechanism is configured to be actuated to pivot the flaps to the open position by a current applied to the actuating mechanism and wherein the actuating mechanism comprises a single electric driving motor for pivoting the flaps synchro-nously and a transmission mechanism mechanically connecting the electric driving motor to at least one flap,
wherein the transmission mechanism comprises a lever arrangement for transmitting a driving force from the electric driving motor to the flaps,
wherein the lever arrangement comprises a driving lever connected to the electric driving motor and at least one displaceable transmission lever, wherein the driving lever may be swivelled by the electric driving motor about a driving axis and wherein the driving lever and the transmission lever are connected with each other in such way that a swivel movement of the driving lever results in a longitudinal movement of the transmission lever, wherein the lever arrangement comprises in addition to the first transmission lever connected to the driving lever at least one second transmission lever at the carrier element, wherein the at least one second transmission lever is fixed to an axle journal of at least one flap and is pivotable about the swivel axis of the flap and wherein the at least two transmission levers are connected to each other in such way that a longitudinal movement of the first transmission lever results in a swivel movement of the at least one second transmission lever causing the corresponding flap to pivot, and wherein the at least one second transmission lever is hinged to the first transmission lever.

11. The vehicle ventilation module of claim 10, wherein the lever arrangement comprises at least two, second transmission levers at the carrier element, wherein each second transmission lever is fixed to at least one flap and is pivotable about the swivel axis of the corresponding flap and wherein the first transmission lever is connected to both second transmission levers in such way that a longitudinal movement of the first transmission lever results in a swivel movement of the two second transmission levers causing their corresponding flaps to pivot.

12. The vehicle ventilation module of claim 1, wherein the carrier frame comprises a rubber sealing to seal a body panel aperture, wherein the rubber sealing is located at a circumference of the carrier frame.

\* \* \* \* \*